(12) United States Patent
Yamada et al.

(10) Patent No.: US 6,814,449 B2
(45) Date of Patent: Nov. 9, 2004

(54) REAR PROJECTOR

(75) Inventors: Haruyoshi Yamada, Shiojiri (JP); Jun Arai, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 10/372,969

(22) Filed: Feb. 26, 2003

(65) Prior Publication Data
US 2004/0021835 A1 Feb. 5, 2004

(30) Foreign Application Priority Data

Mar. 13, 2002 (JP) ........................................ 2002-069338
Dec. 27, 2002 (JP) ........................................ 2002-379572

(51) Int. Cl.[7] ........................ G03B 21/22; G03B 21/14; G03B 21/00; H04N 5/64
(52) U.S. Cl. ........................ 353/74; 353/119; 353/79; 353/70; 348/789
(58) Field of Search ............................. 353/98, 99, 47, 353/50, 74–80, 119; 359/456, 460; 248/646–653, 664, 346.06; 348/787, 794, 825–827, 781–785

(56) References Cited

U.S. PATENT DOCUMENTS

| | | | | |
|---|---|---|---|---|
| 5,741,057 A | * | 4/1998 | Goldberg et al. | 353/74 |
| 5,999,232 A | * | 12/1999 | Kepley et al. | 348/744 |
| 6,604,831 B1 | * | 8/2003 | Prestigomo et al. | 353/119 |
| 6,616,283 B1 | * | 9/2003 | Takano et al. | 353/74 |
| 6,661,473 B1 | * | 12/2003 | Teshima et al. | 348/787 |
| 2003/0137612 A1 | * | 7/2003 | Chang et al. | 348/789 |
| 2003/0189694 A1 | * | 10/2003 | Yamada et al. | 353/77 |
| 2003/0189695 A1 | * | 10/2003 | Arai et al. | 353/77 |
| 2003/0202162 A1 | * | 10/2003 | Arai et al. | 353/74 |

FOREIGN PATENT DOCUMENTS

| | | |
|---|---|---|
| JP | A 08-304739 | 11/1996 |
| JP | A 2001-094905 | 4/2001 |
| JP | A 2002-107663 | 4/2002 |

* cited by examiner

*Primary Examiner*—David Gray
*Assistant Examiner*—Andrew Sever
(74) *Attorney, Agent, or Firm*—Oliff & Berridge, PLC

(57) ABSTRACT

In order to provide a rear projector capable of facilitating position adjustment of an image displayed on a screen and optimizing dispersion of the aspect ratio of the projected image caused by tolerance of components by adjusting the position of the image, a support member (200) is provided with a lateral position adjuster (202) as a planar position adjusting mechanism attached on a support plate of an interior unit in an opposing manner, an inclination adjuster (203) as an inclination position adjusting mechanism vertically provided on the lateral position adjuster (202), and a rotary position adjuster (204) as a rotary position adjusting mechanism attached to the inclination adjuster (203) slanted downward toward rear side.

10 Claims, 20 Drawing Sheets

REAR PROJECTOR

BACKGROUND OF THE INVENTION

1. Field of the Invention

The present invention relates to a rear projector that displays image on a transmissive screen.

2. Description of Related Art

Conventionally, a rear projector that displays a projected and enlarged image on a screen is known as a large-screen display device.

In such rear projector, the light beam from a light source is irradiated on a transmissive liquid crystal panel, where the light beam is modulated in accordance with image information by the transmissive liquid crystal panel, and is enlarged by a projection lens, of which optical path is changed by a reflection mirror to be introduced to a rear side of a screen.

According to the above arrangement, all of the components can be housed in a movable casing and the image on the screen can be viewed in a well-lighted room.

In order to adjust the position of the image displayed on the screen, a position adjuster, which normally adjusts the position of the projection lens in horizontal or vertical position, is necessary for such rear projector. Such mechanism is shown in, for instance, Japanese Patent Laid-Open Publication No. 2001-94905 and Japanese Patent Laid-Open Publication No. 2002-107663.

However, when such simple position adjuster where the position of the projection lens is horizontally or vertically adjusted is used for adjusting the position of the image, there is certain limit capable of adjusting the display position of the image and undisplayable area for displaying the image is formed on the screen even after adjusting the position of the projection lens.

Further, there is difference in the tolerance of the profile of the casing of the rear projector and the tolerance of the component installed in the casing, the tolerance causing difference in aspect ratio of the displayed image, so that the projection dispersion is generated on the image displayed on the screen.

Minute adjustment is required to optimize the projection dispersion. However, since undisplayable area is formed by the conventional divisional display position adjuster, the image cannot be displayed on the entire screen and, when large undisplayable area is formed, the displayed image runs off the edge of the screen and only the image displayed within the frame of the screen can be recognized by a viewer.

SUMMARY OF THE INVENTION

An object of the present invention is to provide a rear projector capable of facilitating the position adjustment of the image displayed on the screen and optimizing the projection dispersion of the aspect ratio of the image caused by tolerance of components.

A rear projector according to an aspect of the present invention comprises: an image generator having an electric optical device that modulates a light beam irradiated by a light source and forms an optical image in accordance with image information and a projection optical system that enlarges and projects the optical image; a box-shaped casing that houses the image generator; and a screen exposed on one of the lateral sides of the box-shaped casing onto which the optical image generated by the image generator is projected, the casing having a support plate that supports the image generator, the image generator being mounted on a support base having a support surface inclined relative to the support plate, the support plate being provided with an inclination position adjusting mechanism that adjusts the inclination position of the image generator relative to the support plate.

The support plate may be a component independent of the casing, or may be one of the upper side, lateral side or lower side of the casing.

In the above aspect of the present invention, the support plate is provided on the casing and the image generator is located on the support base having a support surface slanted relative to the support plate, where the inclination position adjusting mechanism is provided on the support base. The attitude of the image generator projecting the generated optical image is adjusted by the inclination position adjusting mechanism. Accordingly, distortion of the image displayed on the screen can be optimized by adjusting the attitude thereof and the undisplayable area of the image projected on the screen can be narrowed in adjusting the position of the image projected and displayed on the screen by the image generator. Accordingly, even when the aspect ratio of the displayed image changes according to difference in tolerance of the configuration of the casing of the rear projector and tolerance of the components installed in the casing and dispersion is caused on the image displayed on the screen, optimization is possible by adjusting the attitude of the image generator by the inclination position adjusting mechanism, thus displaying the image on the entire screen.

Further, since the image generator is disposed on the support base having the support surface inclined relative to the support plate, the dimension of the rear projector in a direction to be away from the screen, i.e. the thickness of the rear projector can be reduced, thus reducing the size of the projector.

In the rear projector according to an aspect of the present invention, the support base may preferably be disposed on the support plate in an inclined manner.

According to the above arrangement, self-weight of the image generator can be securely received by the support base and the support plate, thus securely supporting the image generator in accordance with attitude adjustment of the image generator.

In the rear projector according to an aspect of the present invention, the support base may preferably be disposed on the lower side of the support plate in an inclined manner.

According to the above arrangement, the image generator is located between the support plate and the support base and is isolated in the casing from the other components such as the screen. Therefore, even when heat is generated in the image generator, heat migration to the other components such as the screen can be prevented by circulating cooling air along the support plate and the support base.

In the rear projector according to an aspect of the present invention, a planar position adjusting mechanism that adjusts the planar position of the image generator relative to the screen may preferably be provided on the support base.

According to the above arrangement, the planar position of the image generator relative to the screen surface can be adjusted by providing the planar position adjusting mechanism on the support base, so that the focus or the display position of the image displayed on the screen can be adjusted.

Accordingly, even when the aspect ratio of the displayed image is changed on account of difference in the tolerance of the configuration of the casing of the rear projector and the tolerance of the components installed in the casing so that the image displayed on the screen is located beyond the screen frame, undisplayable area can be narrowed by the planar position adjusting mechanism, thus displaying the image on the entire screen.

In the rear projector according to an aspect of the present invention, the planar position adjusting mechanism may preferably comprise a slide adjuster that adjusts the position of the image generator in a direction along the screen and in normal line direction of the screen.

According to the above arrangement, since the planar position adjusting mechanism has the slide adjuster, the planar position of the image generator can be adjusted by moving the slide adjuster, thus easily adjusting the planar position of the image generator.

In the rear projector according to an aspect of the present invention, a rotary position adjusting mechanism that adjusts rotary position of the image generator relative to the screen may preferably be provided on the support base.

According to the above arrangement, since the support base is provided with the rotary position adjusting mechanism, the rotation of the image generator that projects the optical image can be adjusted, thus optimizing the position shift caused by distortion or rotation of the image displayed on the screen.

In the above arrangement, the rotary position adjusting mechanism may preferably adjust the rotation of the image generator around planar position of the optical axis of the light beam irradiated by the projection optical system.

When the image displayed on the screen is rotated relative to the screen frame, the rotation of the displayed image has to be adjusted. During the rotation adjustment, if the rotation is adjusted when the rotation center of the displayed image is remote from the displayed image, the displayed image is rotated on the screen surface while causing planar movement.

Since the rotary position adjusting mechanism adjusts the rotation of the image generator around the planar position of the optical axis of the light beam irradiated by the projection optical system, the image generator can be rotated around the main optical axis of the irradiated light beam when the rotation of the image generator is adjusted. In other words, the image displayed on the screen can be rotated around the illumination optical axis of the displayed image, thus restraining planar movement of the image displayed on the screen and easily adjusting the rotation of the displayed image.

Accordingly, there is no need for adjusting the planar position of the image generator after adjusting the rotation of the image generator, thereby enhancing working efficiency.

In the rear projector according to an aspect of the present invention, both of the support plate and the support base may preferably be provided with a screwing mechanism extending toward the opposing support plate or the support base, and the inclination position adjusting mechanism may preferably be a screwing component having a first end screwed to the screwing mechanism of the support plate and a second end screwed to the screwing mechanism of the support base.

According to the above arrangement, since the support plate and the support base have the screwing mechanism and the inclination position adjusting mechanism is a screwing component screwed to the screwing mechanism, the inclination of the support base relative to the support plate can be changed with a simple structure. In other words, the inclination of the image generator can be easily adjusted.

In the rear projector according to the above aspect of the present invention, either one of the support plate and the support base may preferably be provided with a screwing mechanism extending toward the opposing support plate or the support base, and the inclination position adjusting mechanism may preferably be provided with a screwing component having one end screwed to the screwing mechanism provided on one of the support plate and the support base and a convex component provided on the other end of the screwing component rotatably fitted to a concave portion formed on the other of the support plate and the support base.

According to the above arrangement, since one of the support plate and the support base has the screwing mechanism and the concave portion is formed on the other of the support plate and the support base, and since the inclination position adjusting mechanism is provided with the screwing component and the convex portion, the plate base can be moved in advancement and retraction position of the screwing direction by advancing and retracting the screwing component relative to the support plate, thus adjusting the inclination position of the image generator.

Further, in an arrangement where the inclination position adjusting mechanism is disposed at a plurality of locations, since the convex portion rotatably fitted to the concave portion formed on the other of the support plate and the support base is provided on the second end of the screwing component, when the screwing component of one of the plurality of inclination position adjusting mechanisms is advanced and retracted, the engagement of the convex portion formed on the second side of the screwing component and the concave portion formed on the bottom side of the casing can be changed, thus adjusting the inclination of the image generator in a torsional direction of the image generator.

In the above, since the inclination position adjusting mechanism, the planar position adjusting mechanism and the rotary position adjusting mechanism are provided on the support base, the inclination position, the planar position and the rotary position of the image generator can be easily adjusted and the influence of the external force applied on the image generator in adjusting the position of the image generator can be mitigated, thus preventing mutual position shift between the respective optical systems in the image generator and obtaining stable projection image having constant aspect ratio.

A rear projector according to another aspect of the present invention comprises: an image generator having an electric optical device that modulates a light beam irradiated by a light source and forms an optical image in accordance with image information and a projection optical system that enlarges and projects the optical image; a box-shaped casing that houses the image generator; a screen exposed on one of the lateral sides of the box-shaped casing onto which the optical image generated by the image generator is projected; and a reflection optical system that is located on the optical path of the light beam irradiated by the projection optical system to reflect the light beam toward the screen, the reflection optical system being attached to the interior of the casing by a first holder holding the upper end and the lower end of the reflection optical system, in which an attitude adjuster that adjusts the position of the optical axis of the reflection optical system in up-shift direction relative to the light beam irradiated by the projection optical system is provided on the first holder on the upper end.

Normally, the casing that houses the image generator, the reflection optical system and the screen is formed by injection molding etc., and slight dimension tolerance is inevitably caused in such casing.

When the reflection optical system such as mirror is fixed to the casing, the mirror is bent on account of the slight dimension tolerance and there is projection dispersion in the images displayed on the screen on account of the change in the aspect ratio of the projected image.

According to the above aspect of the present invention, since the reflection optical system is attached to the interior of the casing by the holder and the attitude adjuster is provided on the holder on the upper end, the up-shift direction of the optical axis of the reflection optical system can be adjusted by adjusting the attitude of the reflection optical system by the attitude adjuster.

Accordingly, even when the aspect ratio of the displayed image is changed on account of the difference in tolerance of the configuration of the casing of the rear projector and the tolerance of the components installed in the casing causing projection dispersion on the image displayed on the screen, optimization is possible by adjusting the attitude of the reflection optical system by the attitude adjuster, thereby displaying the image on the entire screen.

The reflection optical system may preferably be composed of an approximately trapezoidal mirror, which can be arranged in a minimum shape required in accordance with the aspect ratio of the image projected by the image generator, so that the size and weight of the rear projector can be reduced while sufficiently working as the reflection optical system.

In the rear projector according to an aspect of the present invention, the first holder on the upper end may preferably have a groove for an end of the reflection optical system to be inserted, and a gap may preferably be formed between the end of the reflection optical system and the bottom of the groove when the reflection optical system is attached.

According to the above arrangement, since the holder on the upper end has the groove and a gap is formed between the end of the reflection optical system and the bottom of the groove when the reflection optical system is attached, the end of the reflection optical system does not collide with the bottom of the groove of the holder when the attitude of the reflection optical system is adjusted by the attitude adjuster, thereby preventing the external force being locally applied on the end of the reflection optical system.

Accordingly, the attitude of the reflection optical system can be smoothly adjusted by the attitude adjuster and distortion of the reflection optical system by the external force can be avoided by preventing the external force being applied on the end of the reflection optical system, thus mitigating projection dispersion of the image displayed on the screen.

In the rear projector according to an aspect of the present invention, an elastic member may preferably be interposed between a surface of the first holder and the surface of the reflection optical system opposite to the reflection surface thereof.

According to the above arrangement, since the elastic member is interposed between the surface of the first holder and the surface of the reflection optical system opposite to the reflection surface thereof, damage on the end of the reflection optical system caused by friction between the holder and the reflection optical system in accordance with attitude adjustment of the reflection optical system by the attitude adjuster can be mitigated.

Further, by the pressing force of the elastic member, the reflection surface of the reflection optical system is brought into contact with the end of the holder and the attitude of the reflection optical system can be adjusted while keeping the contact there between.

Accordingly, there is no distortion on the reflection optical system by adjusting the attitude of the reflection optical system by the attitude adjuster, thereby accurately maintaining the inclination of the reflection optical system.

In the rear projector according to an aspect of the present invention, the reflection optical system may preferably be attached to the casing by a second holder holding the lateral side of the reflection optical system, and an elastic member may preferably be interposed between a surface of the second holder and the reflection surface of the reflection optical system.

According to the above arrangement, since the reflection optical system is attached to the casing by the second holder holding the lateral side thereof and the elastic member is interposed between a surface of the second holder and the reflection surface of the reflection optical system, the self-weight of the reflection optical system can be supported by the second holder, so that deformation of the reflection optical system caused by self-weight of the reflection optical system such as distortion can be prevented and change in aspect ratio of the image displayed on the screen by the deformation can be avoided, thereby mitigating projection dispersion.

Further, since the elastic member is interposed on a surface of the second holder to be in contact with the reflection optical system, the end of the reflection optical system can be received by the elastic deformation of the elastic member in adjusting the attitude of the reflection optical system by the attitude adjuster.

Accordingly, the end of the reflection optical system can be received by the elastic deformation of the elastic member in accordance with inclination of the reflection optical system, thereby avoiding restriction of the inclination of the reflection optical system by the fixed holder.

DETAILED DESCRIPTION OF PREFERRED EMBODIMENT(S)

First Embodiment

A first embodiment of the present invention will be described below with reference to attached drawings.

1-1. Primary Arrangement of Rear Projector

Figure 1:
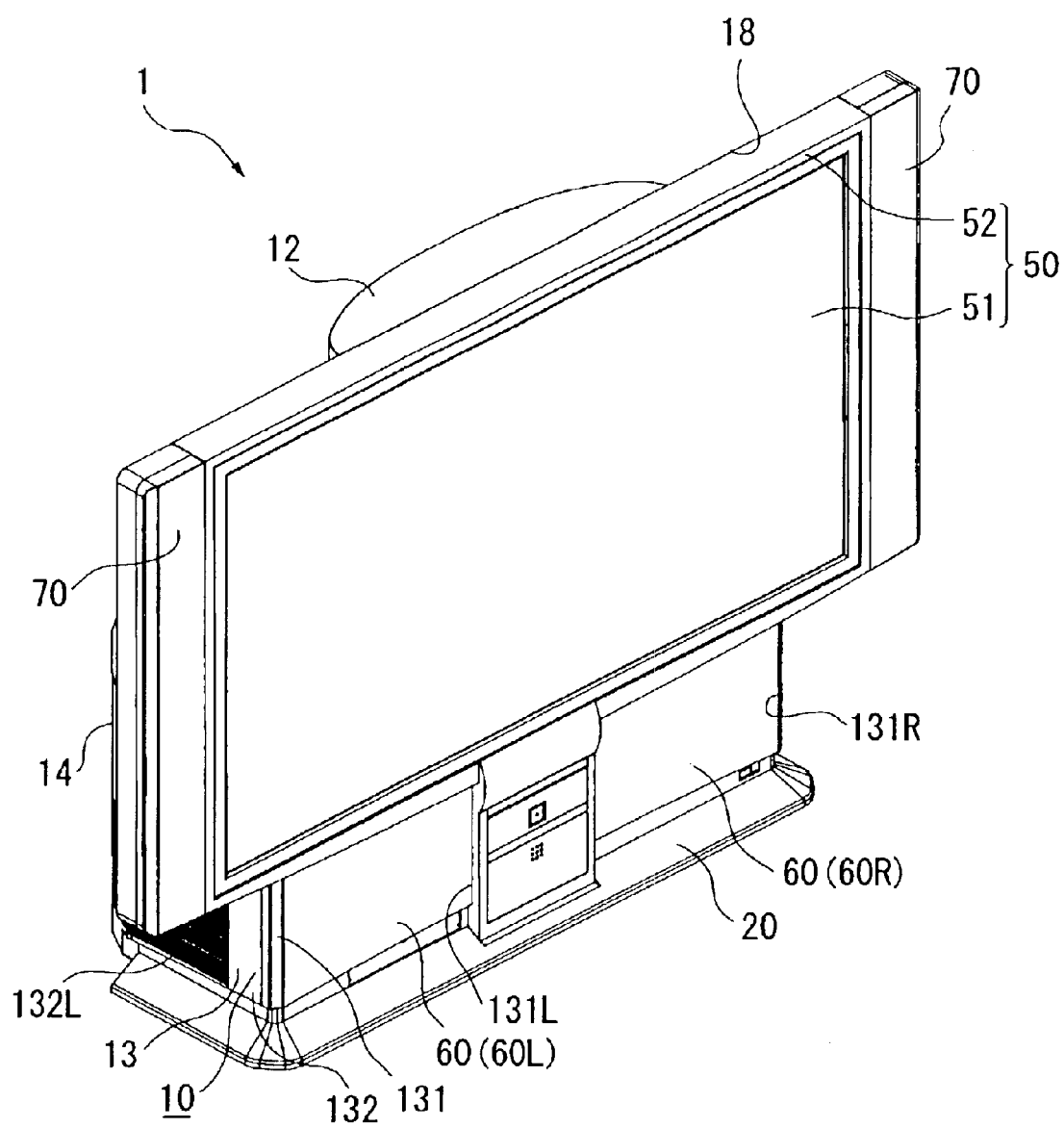
FIG. 1 is a perspective view of a rear projector seen from front side according to first embodiment of the present invention.
Figure 2:
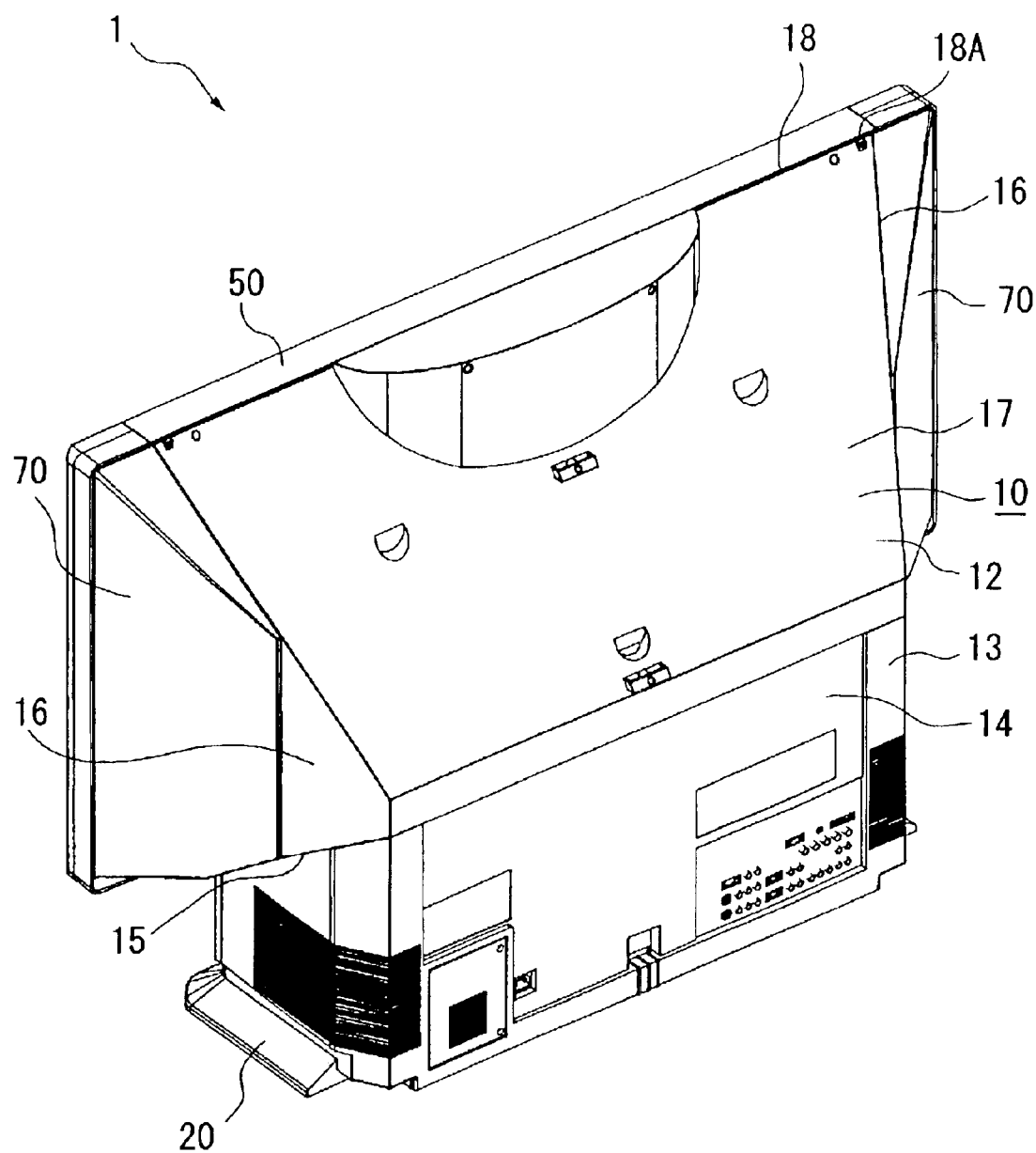
FIG. 2 is a perspective view of a rear projector seen from rear side according to the aforesaid embodiment of the present invention.
Figure 3:
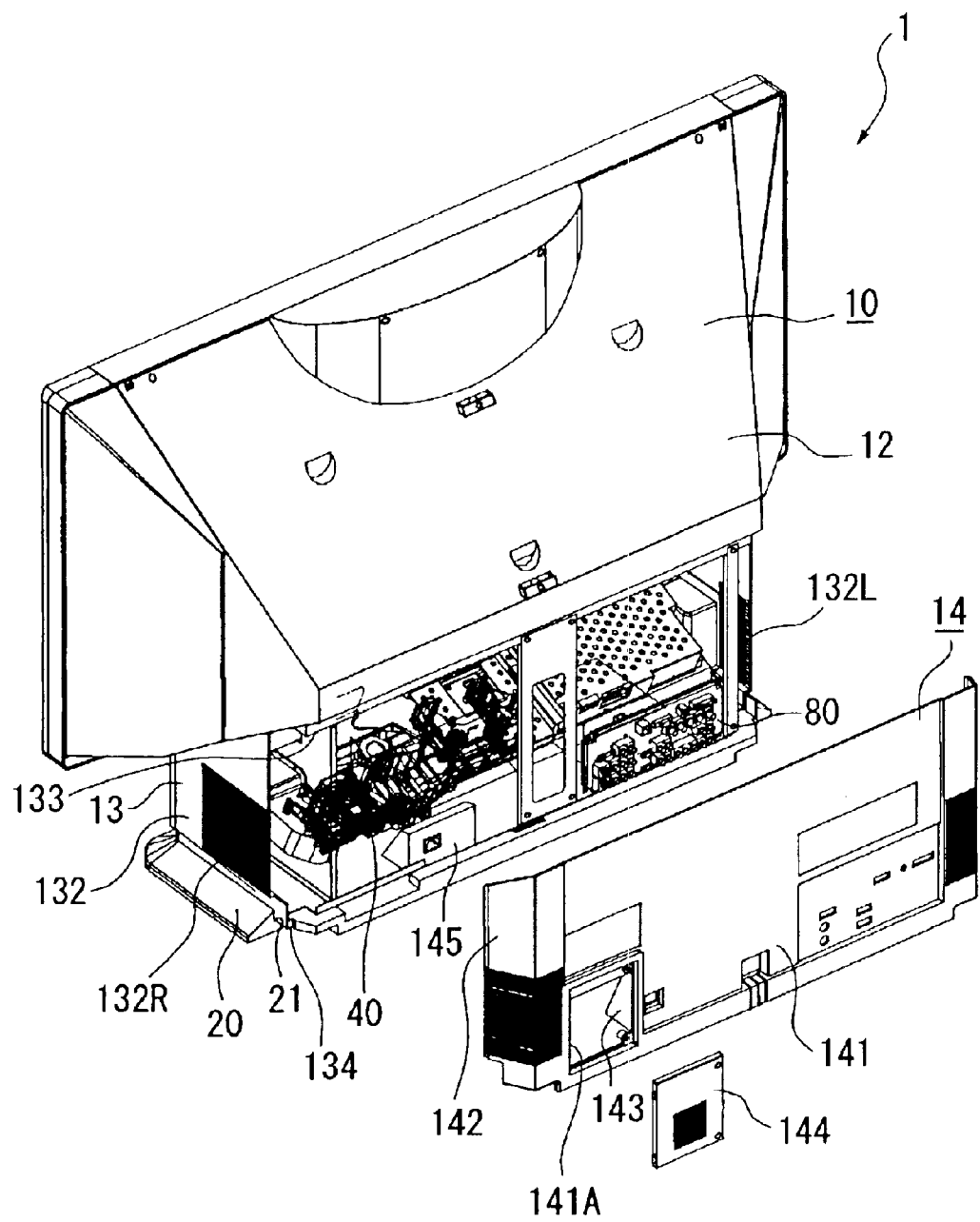
FIG. 3 is an exploded perspective view of a rear projector seen from rear side according to the aforesaid embodiment, which specifically shows that a back cover is removed from FIG. 2.
Figure 4:
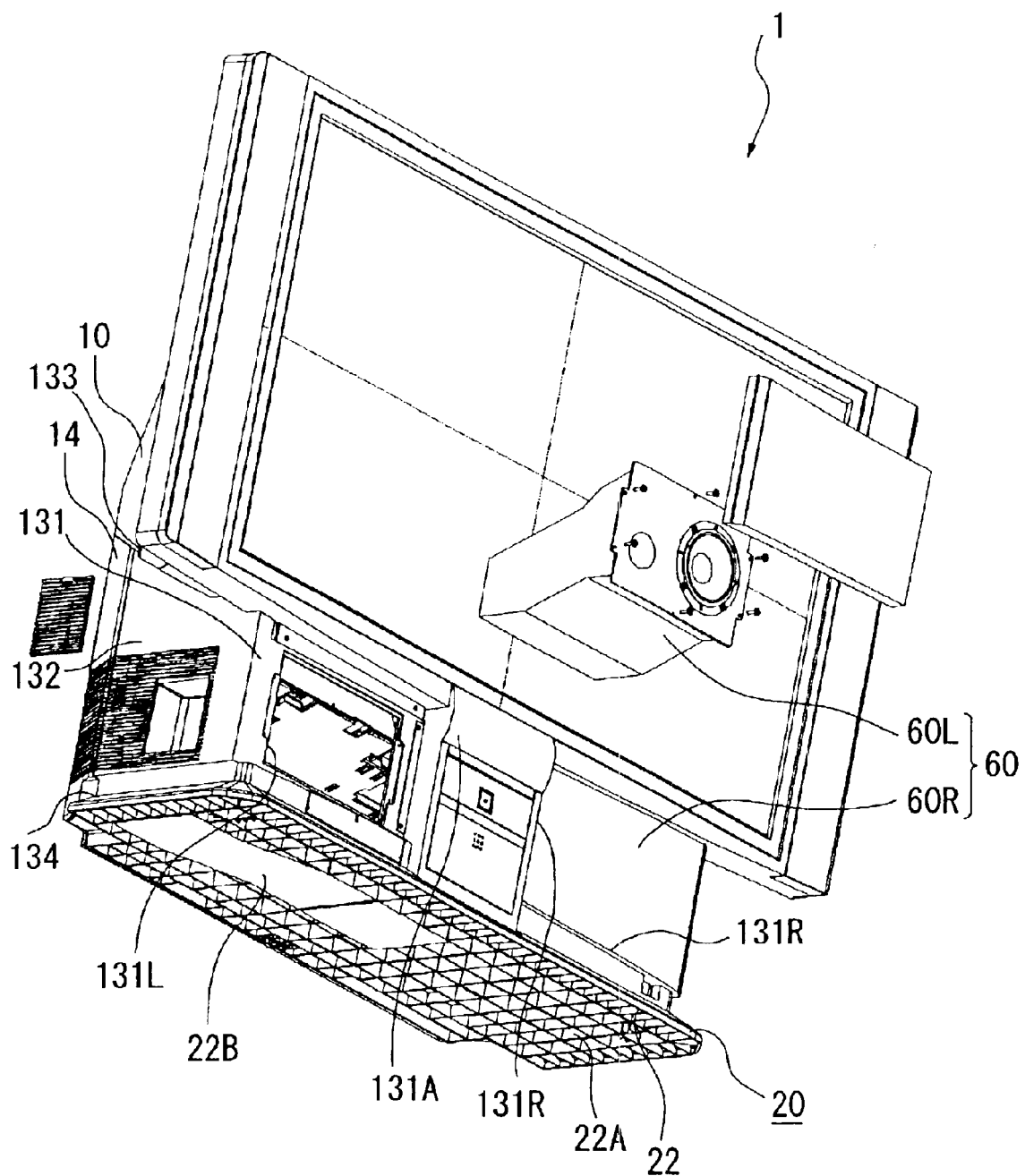
FIG. 4 is an exploded perspective view of a rear projector seen from bottom side according to the aforesaid embodiment.
Figure 5:
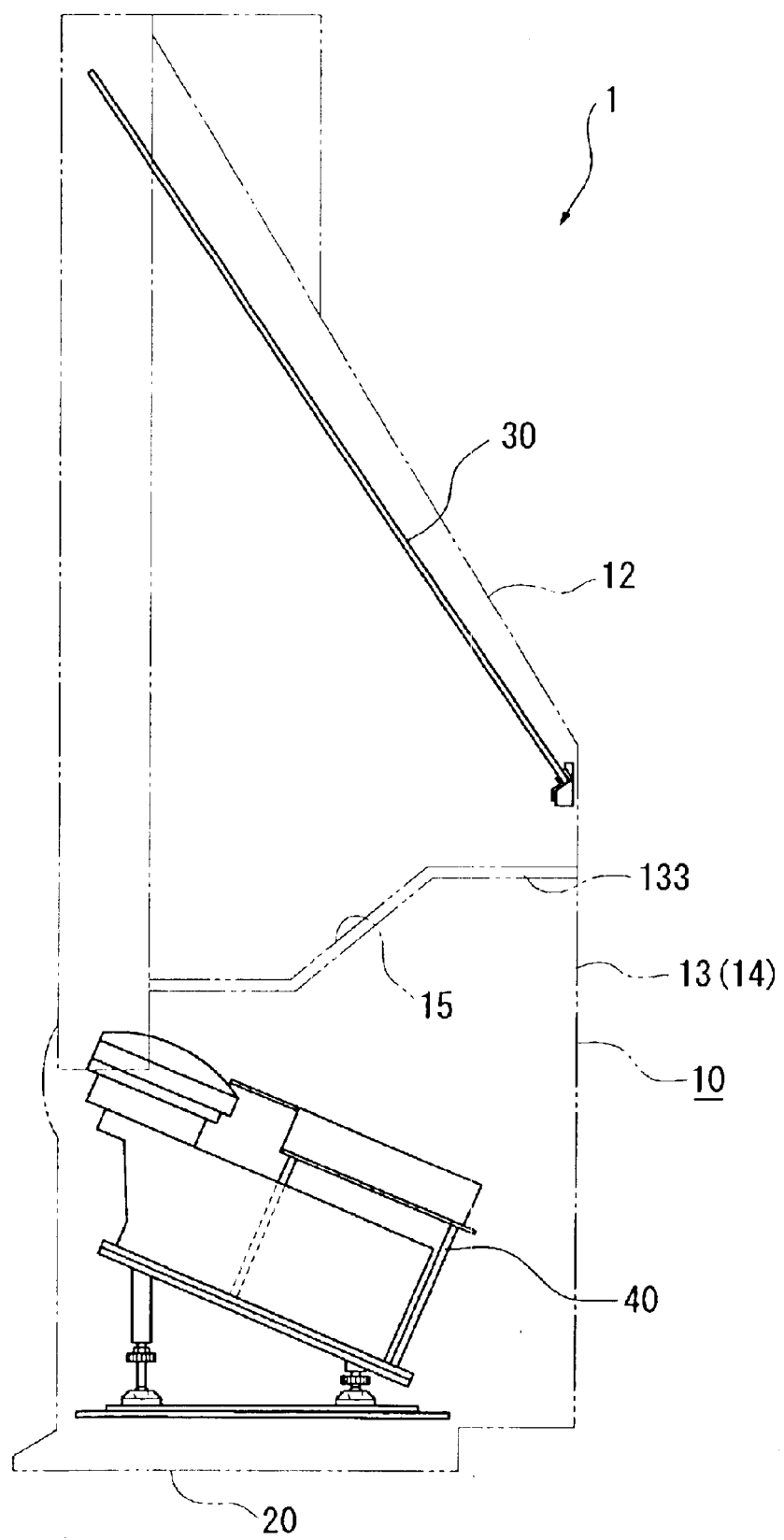
FIG. 5 is a vertical cross section showing a rear projector according to the aforesaid embodiment.

FIG. 1 is a perspective view showing a rear projector seen from front side according to an aspect of the present invention. FIG. 2 is a perspective view of the rear projector 1 seen from rear side. FIG. 3 is an exploded perspective view of the rear projector 1 seen from rear side, which specifically shows that a back cover 14 is removed from FIG. 2. FIG. 4 is an exploded perspective view of the rear projector 1 seen from bottom side. FIG. 5 is a vertical cross section showing the rear projector 1.

Primary arrangement of the rear projector 1 will be described below with reference to FIGS. 1 to 5.

As shown in FIGS. 1 to 5, the rear projector 1 modulates a light beam irradiated by a light source in accordance with image information to form an optical image and enlarges and projects the optical image on a screen, which includes a cabinet 10 constituting a casing, a leg 20 provided on the lower side of the cabinet 10, an interior unit 40 located inside the cabinet 10, a reflection mirror 30 (FIG. 5) also located inside the cabinet 10, and a screen 51 exposed on a side of the cabinet 10. The cabinet 10, the interior unit 40, the reflection mirror 30 and the screen 51 construct a projector body.

Incidentally, for the convenience of explanation, left side seen from front side is referred to as left and right side seen from front side is referred to as right in the present embodiment.

The cabinet 10 is a casing of synthetic resin for accommodating the interior unit 40 and the reflection mirror 30. As shown in FIGS. 2 and 3, the cabinet 10 has a lower cabinet 13 of C-shaped vertical cross section accommodating the interior unit 40 and covering approximately entire front, upper and lower sides and right and left sides, a back cover 14 covering the rear side and a part of the right and left sides, and an upper cabinet 12 of triangle vertical cross section disposed above the lower cabinet 13.

The dimension of the lower cabinet 13 in right and left direction along the surface of the screen 51 is smaller than the dimension of the upper cabinet 12 in right and left direction along the surface of the screen 51.

The back cover 14 is detachably attached to the lower cabinet 13.

As shown in FIG. 4, the lower cabinet 13 includes a front side 131, right and left lateral sides 132, an upper side 133 and a lower side 134.

As shown in FIG. 4, a central portion 131A bulging toward front side in accordance with projection of a projection lens constituting the interior unit 40 is provided approximately at the center of the front side 131. Rectangular openings 131R and 131L of approximately the same dimension are formed on both sides of the central portion 131A. Woofer boxes 60 (60R and 60L) as a speaker for reproducing low-pitched sound are respectively attached to the openings 131R and 131L. The woofer boxes 60R and 60L are attachable to and detachable from the openings 131R and 131L from the front side.

Incidentally, though not clearly shown in the illustration, various device-connecting terminals such as connector for connecting a computer, a video input terminal and audio-connection terminal are provided on the lower side of the left opening 131L.

Further, as shown in FIG. 3, slit-shaped openings are formed on the right and left lateral sides 132 of the lower cabinet 13. The left opening is an intake opening 132L for introducing a cooling air into the interior of the projector and the right opening is an exhaust opening 132R for discharging the air having introduced and cooled the interior.

The upper side 133 opposes to a lower side of the upper cabinet 12 (described below). The lower side 134 abuts to the receiver surface of the leg 20 (described below).

As shown in FIG. 3, the back cover 14 includes a rear side 141 and right and left lateral sides 142.

A second intake opening 141A for introducing cooling air is formed on the right side (left side seen from rear side) of the rear side 141 of the back cover 14. An air filter 143 is attached to the second intake opening 141A. A cover 144 for shutting the second intake opening 141A provided with the air filter 143 is detachably attached to the opening 141A. An opening for inlet connector 145 is provided on the left side (right side seen from rear side) of the second intake opening 141A of the rear side 141.

Various device connection terminals such as connector for connecting a computer, a video input terminal and audio-connection terminal are provided on the left side (right side seen from rear side) of the rear side 141, and an interface board 80 is provided on the inner surface of the rear side 141.

As shown in FIGS. 2 and 5, the upper cabinet 12 is a casing of triangle vertical cross section for accommodating the reflection mirror 30, which includes a lower side 15 of approximately rectangle plate, right and left lateral sides 16 of triangle plate vertically extending from both ends of the lower side 15, a rear side 17 spanning over the right and left sides and slanting toward the lower rear side, and a front side 18 of approximately rectangle plane. Rectangular opening 18A is formed on the planar front side 18. A screen 51 covering the opening 18A is attached to the front side 18.

Figure 6:
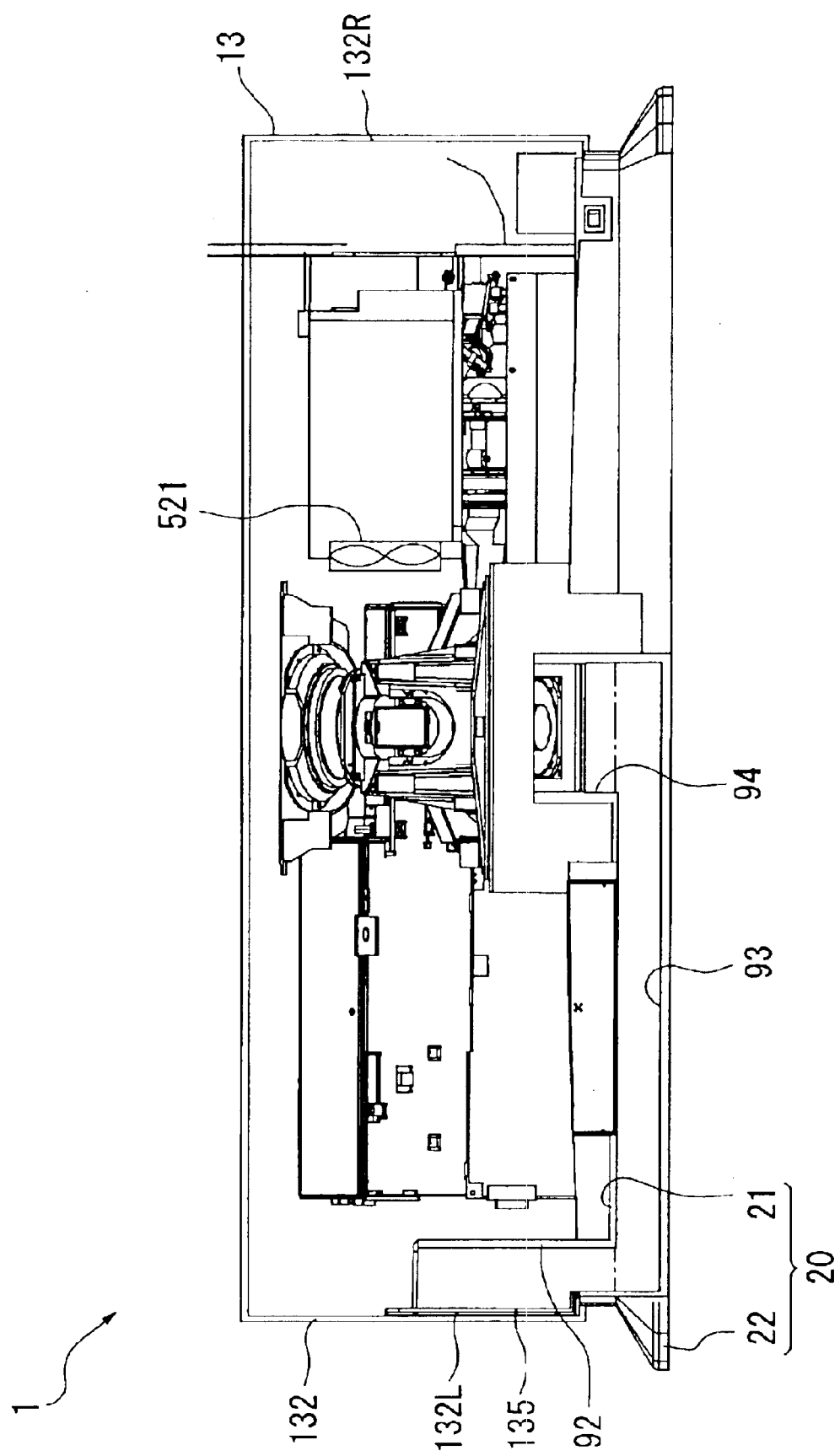
FIG. 6 is a vertical cross section of a lower cabinet and a leg seen from front side according to the aforesaid embodiment.

FIG. 6 is a vertical cross section of the lower cabinet 13 and the leg 20 of the rear projector 1 seen from front side.

As shown in FIGS. 3, 4 and 6, the leg 20 is a synthetic resin member supporting the projector body and covering a part of the front side 131 of the lower cabinet 13, which includes a receiver surface 21 to be abutted to the entire lower side 134 of the lower cabinet 13, and a rib-shaped support 22 surrounding the back side of the receiver surface 21 and having a predetermined height dimension.

A concave groove dented for a dimension corresponding to the height of the support 22 is formed on the receiver surface 21, the groove extending from the left side to the center of the central area in front and back direction.

As shown in FIG. 4, the backside of the support 22 abuts to a surface of floor etc. when the rear projector 1 is installed on a floor surface or upper surface of desk. A reinforcing rib 22A of matrix-shape having a predetermined height is formed on the inner circumference of the support 22. The reinforcing rib 22A enhances the rigidity of the leg 20 and prevents position shift from the floor surface etc.

A planar portion 22B having no reinforcing rib 22A is provided on a part of the inner area of the support 22, the planar portion 22B extending from the left to the center of central area in front and back direction on the backside of the support 22. The planar portion 22B is the lower side of the concave groove formed on the receiver surface 21.

As shown in FIG. 6, when the projector body is mounted on the receiver surface 21 having the concave groove, a third duct 93 extending from the left lateral side 132 of the lower cabinet 13 to the central portion in right and left direction is formed. However, the lower side of the projector body does not abut to both peripheral ends of the third duct 93 so that the peripheral end around the left lateral side 132 and the peripheral end at the approximate center are left open.

An end of a second duct 92 is connected to the opening adjacent to the left lateral side 132. The other end of the second duct 92 is connected to the intake opening 132L formed on the left lateral side 132 through an air filter 135.

An end of fourth duct 94 is connected to an opening on the central peripheral end at the central portion. The other end of the fourth duct 94 is disposed on the lower side of an optical device constituting the projector body through an elastic member such as a sponge.

Figure 7:
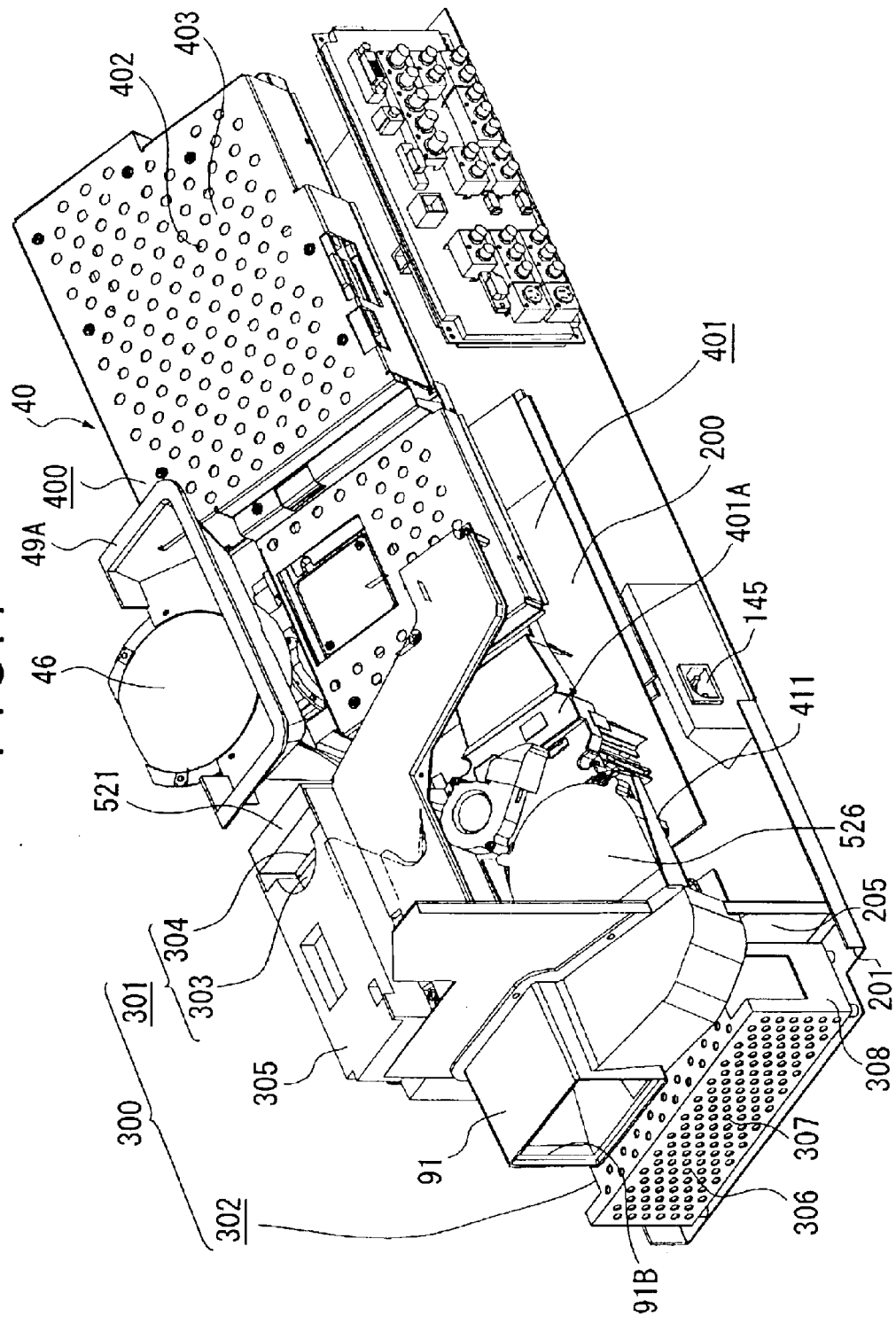
FIG. 7 is a perspective view of an interior unit seen from rear side according to the aforesaid embodiment.

FIG. 7 is a perspective view of the interior unit seen from rear side.

As described below in detail, the interior unit 40 is a device located on the receiver surface 21 of the leg 20 for forming a predetermined optical image in accordance with inputted image information and outputting sound and image by amplifying the sound signal added to the image information.

Figure 8:
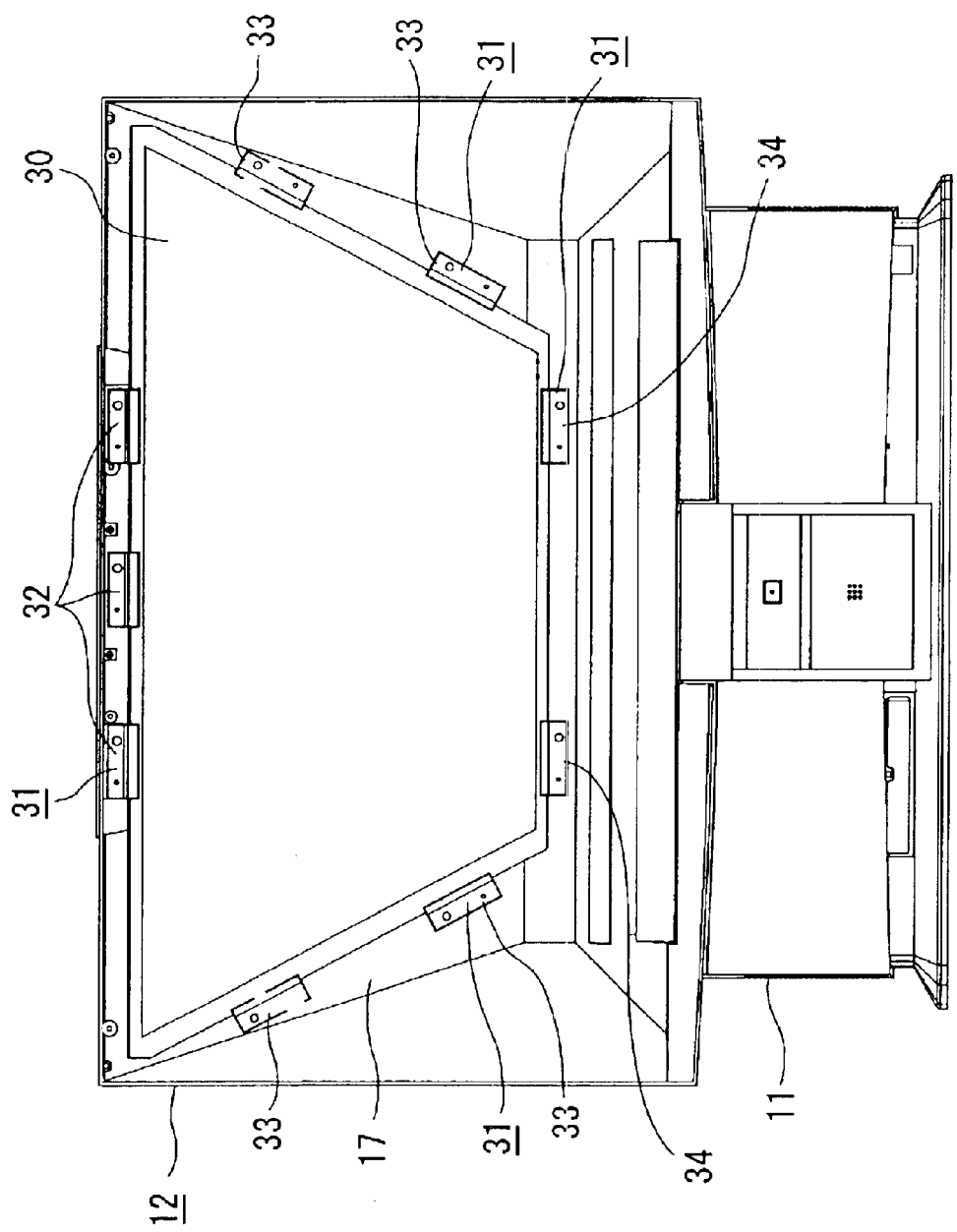
FIG. 8 is a front elevational view of a rear projector according to the aforesaid embodiment where a screen is removed.

FIG. 8 is a front elevational view with the screen 51 being removed from the rear projector 1.

The reflection mirror 30 is an ordinary reflection mirror of approximately trapezoidal shape, which is attached to the inside of the rear side 17 of the upper cabinet 12 so that the long side of the trapezoid comes to the upper side. A mirror holder 31 as a holder for holding the reflection mirror 30 at a predetermined position is formed on an inner side of the rear side 17 of the upper cabinet 12. The mirror holder 31 holds the long side, short side and oblique sides of the reflection mirror 30 so that there is no distortion on the reflection mirror 30.

As shown in FIG. 1, the screen 51 is a transmissive screen on which the optical image enlarged in the interior unit body 400 and reflected by the reflection mirror 30 is projected from the backside. The screen 51 has a screen 51 and a screen cover 52 for accommodating the screen 51 with the front side of the screen 51 being exposed.

As shown in FIG. 2, speaker boxes 70 are respectively attached to the right and left lateral sides 16 of the upper cabinet 12 as a body independent of the upper cabinet 12. The speaker box 70 is a box-shaped body working as a speaker. The front side of the speaker box 70 is substantially flush with the front side of the screen 51 so that the both sides are approximately parallel in vertical direction.

As shown in FIG. 1, the screen cover 52 is fixed to the upper cabinet 12 with the screen 51 being accommodated and the front side 18 of the upper cabinet 12 and the front side of the speaker box 70 being covered.

1-2 Arrangement of Interior Unit

As shown in FIG. 7, the interior unit 40 has a interior unit body 400, a power source block 300 for supplying electric power to the interior unit body 400 or a below-described sound signal amplifier 307 (amplifier), and a base member 201 for supporting the interior unit body 400 and the power source block 300.

As shown in FIG. 7, the interior unit body 400 has a light source 411 located on the left side, which includes an optical unit 401 of planarly-viewed L-shape extending from the light source 411 to the right and further front side, and a support member 200 as a support base that supports the optical unit 401 to adjust position thereof.

Though described below in detail, as shown in FIG. 7, the optical unit 401 has an optical unit body 401A as an image generator for optically processing the light beam emitted by the light source 411 to form an optical image in accordance with image information, and a control board 402 covering a part of the right side of the optical unit body 401A to extend from the center to the left side (right side seen from rear side).

The control board 402 has a controller having CPU etc., which controls the drive of the optical device as a component of the optical unit body 401A in accordance with inputted image information and is located to cover a part of the right side of the optical unit body 401A to be extended to the right side.

The control board 402 is surrounded by a metal shield 403 and is attached to the support member 200 to span over the optical unit body 401A through a column member.

As shown in FIG. 7, the power source block has a first power source 301 provided on the front side of the light source 411, and a second power source 302 provided on the left side of a partition 205 seen from rear side.

The first power source 301 includes a first power source 303 and a lamp driving circuit (ballast) 304 adjacent to the first power source 303.

The first power source 303 supplies electric power fed from the outside to the lamp driving circuit 304, the control board 402 etc. through a not-illustrated power cable connected to the inlet connector 145.

The lamp driving circuit 304 supplies electric power fed from the first power source 303 to the light source lamp constituting the optical unit 401, which is electrically coupled with the light source lamp. The lamp driving circuit 304 is, for instance, wired to a non-illustrated board.

The first power source 301 is covered with a metal shield 305 with right and left sides being opened, thereby preventing leakage of electromagnetic noise from the first power source 303 and the lamp driving circuit 304.

An axial-flow fan 521 is attached to a center opening of the shield 305 on the right side seen from rear side, which blows cooling air in a direction in which the first power source 301 extends, i.e. from the central portion to the right side. According to the arrangement, the shield 305 also works as a duct for guiding the cooling air.

The second power source 302 has a second power source 306 and a sound signal amplifier 307 for amplifying the inputted sound signal.

The second power source 306 supplies electric power fed from the outside to the sound signal amplifier 307 through a non-illustrated power cable connected to the inlet connector 145.

The sound signal amplifier 307 is driven by the electric power supplied by the second power source 306 to amplify the inputted sound signal, which is electrically coupled with the speaker box and the woofer box (not illustrated in FIG. 8). The sound signal amplifier 307 is, for instance, wired to a non-illustrated board.

The base member 201 opposes to the receiver surface 21 of the leg 20 to support the components of the interior unit 40, which is constructed by metal plate member.

As shown in FIG. 7, the partition 205 for insulating heat between the right and left spaces vertically extends from the upper side of the base member 201 on the left side seen from the rear side. The partition 205 spaces the first power source 301 and the light source 411 of the optical unit 401, and the second power source 302 and insulates heat between the right and left spaces, thereby preventing heat migration between the first power source 301 and the light source 411, and the second power source 302.

Further, an engaging groove engaging with a non-illustrated rail member provided on the receiver surface 21 of the leg 20 is provided on the lower side of the base member 201, which is advanceable and retractable in front and back direction. In other words, the interior unit 40 can be slidably taken out from the lower cabinet 13 to the rear side by the advancement and retraction of the base member 201.

1-3. Detailed Construction of Optical System

Figure 9:
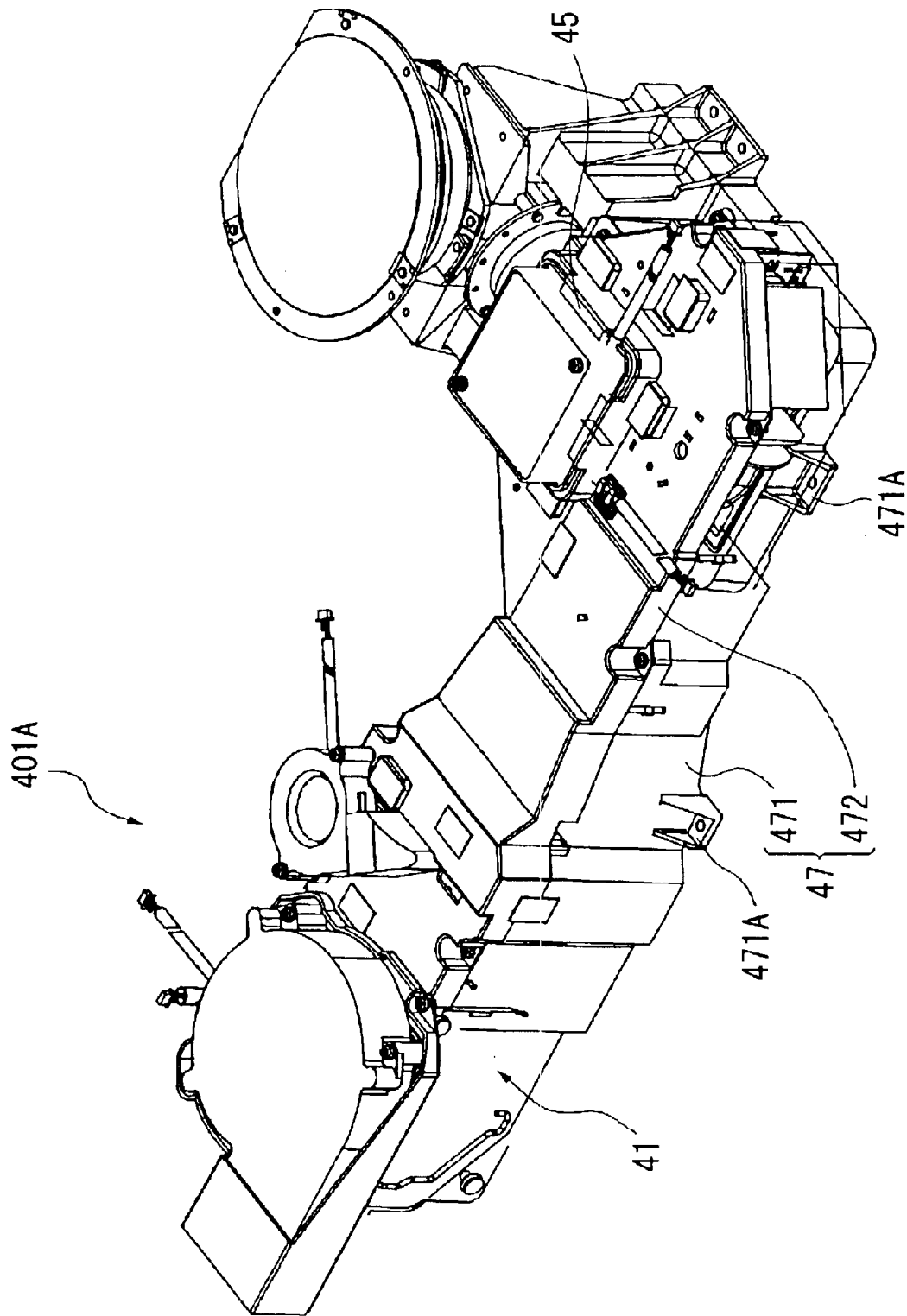
FIG. 9 is a perspective view showing an optical unit body according to the aforesaid embodiment.
Figure 10:
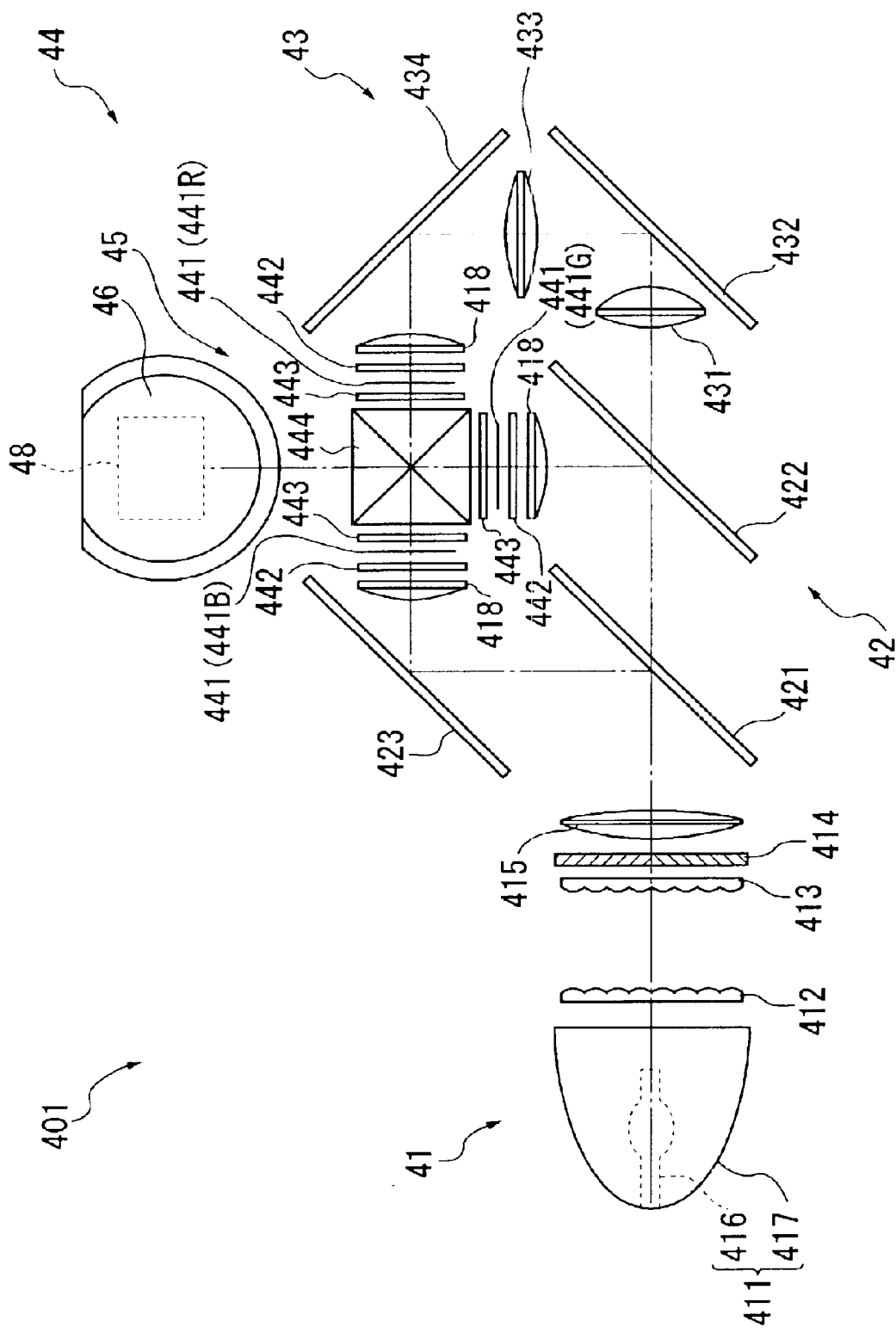
FIG. 10 is a plan view schematically showing the optical unit body according to the aforesaid embodiment.

FIG. 9 is a perspective view showing an optical unit body 401A. FIG. 10 is a plan view schematically showing the optical unit body.

As shown in FIG. 10, the optical unit 401 is a unit for optically processing the light beam irradiated by a light source lamp as a component of the light source to form an optical image in accordance with image information, which includes an integrator illuminating optical system 41, a color separating optical system 42, a relay optical system 43, an optical device 44, a right-angle prism 48 and the projection lens 46 as a projection optical system.

The integrator illuminating optical system 41 is a system for substantially uniformly illuminating the image formation area of the three liquid crystal panels 441 constituting the optical device 44 (respectively referred to as liquid crystal panel 441R, 441G and 441B for every color lights of red, green and blue), which includes a light source 411, a first lens array 412, a second lens array 413, a polarization converter 414 and a superposing lens 415.

The light source 411 has a light source lamp 416 as a radiation light source and a reflector 417, which changes the radial light beam irradiated by the light source lamp 416 into a parallel light beam by the reflector 417 to emit the parallel light beam toward the outside.

A halogen lamp is used as the light source lamp 416. Incidentally, metal halide lamp and a high-pressure mercury lamp etc. may be used instead of the halogen lamp.

A parabolic mirror is used as the reflector 417. Incidentally, a combination of a concave lens which parallelized nonparallel light reflected by the reflector and an ellipsoidal mirror may be used instead of the parabolic mirror.

The first lens array 412 is a plurality of small lenses arranged in matrix, the lenses having substantially rectangular profile viewed from optical axis direction. The respective lenses split the beam emitted from the light source lamp 416 into a plurality of sub-beams. The profile of the respective lenses is approximately similar to the configuration of the image formation area of the liquid crystal panel 441. For instance, when the aspect ratio (ratio of horizontal and vertical dimensions) of the liquid crystal panels 441 is 4:3, the aspect ratio of the respective lenses is also set as 4:3.

The second lens array 413 has approximately the same arrangement as the first lens array 412, where the small lenses are disposed in matrix. The second lens array 413 as well as the superposing lens 415 focuses the image from the respective small lenses of the first lens array 412 onto the liquid crystal panel 441.

The polarization converter 414 is disposed between the second lens array 413 and the superposing lens 415 and is integrated with the second lens array 413 as a unit. The polarization converter 414 converts the light from the second lens array 413 to a single polarized light in order to enhance light utilization efficiency in the optical device 44.

Specifically, the respective sub-beams converted into single polarized light by the polarization converter 414 are substantially superposed on the liquid crystal panel 441 of the optical device 44 by superposing lens 415. Since the rear projector 1 using the liquid crystal panel 441 for modulating polarized light can use only single polarized light, approximately half of the light from the light source lamp 416 emitting other random polarized light cannot be used. Accordingly, by using the polarization converter 414, all of the light emitted from the light source lamp 416 is converted into single polarized light to enhance light utilization efficiency in the optical device 44.

Incidentally, such polarization converter 414 is disclosed in, for instance, Japanese Patent Laid-Open publication No. Hei 8-304739.

The color separating optical system has two dichroic mirrors 421 and 422 and a reflection mirror 423, the dichroic mirrors 421 and 422 separating the plurality of sub-beams irradiated by the integrator illuminating optical system 41 into three color lights of red (R), green (G) and blue (B).

The relay optical system 43 has incident-side lens 431, a relay lens 433 and reflection mirrors 432 and 434, and introduces the red color light separated by the color separating optical system 42 onto the liquid crystal panel 441R.

At this time, the red light component and the green light component of the light beam irradiated from the illuminating optical integrator system 41 are transmitted through the dichroic mirror 421 of the color separating optical system 42 and the blue light component is reflected by the dichroic mirror 421. The blue light reflected by the dichroic mirror 421 is reflected by the reflection mirror 423, which reaches to the liquid crystal panel 441B for blue-color through a field lens 418. The field lens 418 converts the respective sub-beams emitted from the second lens array 413 into a light beam parallel to central axis (main beam) thereof. The field lenses 418 provided in front of the other liquid crystal panels 441G and 441B function in the same manner.

In the red light and the green light transmitted through the dichroic mirror 421, the green light is reflected by the dichroic mirror 422 to reach the liquid crystal panel 441G for green color through the field lens 418. On the other hand, the red color transmits through the dichroic mirror 422 to pass the relay optical system 43 and reach the liquid crystal panel 441R for red color through the field lens 418.

Incidentally, the relay optical system 43 is used for the red color light in order to prevent decrease in utilization efficiency of light on account of light diffusion caused by longer length of the optical path of the red light than the length of the optical path of the other color lights. In other words, in order to directly transmit the sub-beam incident on the incident-side lens 431 to the field lens 418.

The optical device 44 is for modulating the incident light beam in accordance with image information to form a color image, which has three incident-side polarization plates 442, the liquid crystal panels 441R, 441G and 441B disposed on the after-stage of the respective incident-side polarization plates 442 as optical modulators, an irradiation-side polarization plate 443 disposed on the after-stage of the respective incident-side polarization plates 442, and a cross dichroic prism 444 as a color combining optical system.

The liquid crystal panels 441R, 441G and 441B use, for instance, a polysilicon TFT as a switching element.

In the optical device 44, the color lights separated by the color-separating optical system 42 are modulated by the three crystal panels 441R, 441G and 441B, the incident-side polarization plate 442 and the irradiation-side polarization plate 443 in accordance with image information to form an optical image.

The incident-side polarization plate 442 transmits only a polarized light of a predetermined direction among the respective color lights separated by the color separating optical system 42 and absorbs the other light beam, which is constructed by forming a polarization film on a substrate of sapphire glass etc.

The irradiation-side polarization plate 443 is constructed in an approximately the same manner as the incident-side polarization plate 442, which transmits only a polarized light of a predetermined direction among the light beam irradiated by the liquid crystal panels 441 (441R, 441G and 441B) and absorbs the other light beam.

The polarization axes of the incident-side polarization plate 442 and the irradiation-side polarization plate 443 are set orthogonal with each other.

The cross-dichroic prism 444 combines the optical image irradiated by the irradiation-side polarization plate 443 and modulated for respective color lights to form a color image.

A dielectric multi-layer film for reflecting red color light and a dielectric multi-layer film for reflecting blue color light are formed along boundary of four right-angled prisms of the cross dichroic prism 444, the dielectric multi-layer films combining three color lights.

The above-described liquid crystal panels 441, the irradiation-side polarization plate 443 and the cross dichroic prism 444 are constructed as an integrated unit of optical device body 45. Incidentally, the incident-side polarization plate 442 is slidably fitted and attached to a groove (not shown) formed on the light guide 47.

Though not specifically shown, the optical device body 45 has the cross dichroic prism 444, a metal base for supporting the cross dichroic prism 444 from the lower side, a metal holding plate for holding the incident-side polarization plate 443 attached to the light-beam incident end of the cross dichroic prism 444, and liquid crystal panels 441 (441R, 441G and 441B) held by four pins 453 attached to the light-beam-incident side of the holding plate. A predetermined gap is secured between the holding plate and the liquid crystal panel 441, so that the cooling air flows through the gap.

The right-angle prism 48 is located on light-irradiation side of the cross dichroic prism 444 of the optical device 44, which bends and reflects the color image combined by the cross dichroic prism 444 in a direction of the projection lens 46, i.e. bends and reflects the forwardly-irradiated color image in upward direction.

The projection lens 46 enlarges to project the color image reflected by the right-angle prism 48 on the reflection mirror 30. The projection lens 46 is supported by a non-illustrated head component screwed to the support member 200.

As shown in FIG. 7, a box-shaped cover 49A having open upper side is provided around the projection side of the projection lens 46. An opening for securing optical path of the projected optical image is formed around the lower side 15 of the upper cabinet 12. The cover 49A abuts to the surrounding of the opening through an elastic member to enclose the opening.

The above-described optical systems 41 to 44 and 48 are accommodated in a light guide 47 made of synthetic resin as an optical component casing shown in FIG. 9.

Though specific illustration of the inside of the light guide 47 is omitted, as shown in FIG. 9, the light guide 47 has a lower light guide 471 having the groove for the respective optical components 412 to 415, 418, 421 to 423, 431 to 434 and 442 (FIG. 10) to be slidably fitted from the above, and a lid-shaped lower light guide 472 for closing the upper opening side of the lower light guide 471.

The above-described optical unit body 401A is supported by the support member 200 through a fixing hole 471A (FIG. 9) provided on the outer circumference of the lower light guide 471, where the attitude of the optical unit body 401A is adjusted to adjust the aspect ratio of the displayed image projected on the screen 51.

1-4. Structure of Interior Cooling Mechanism

Figure 11:
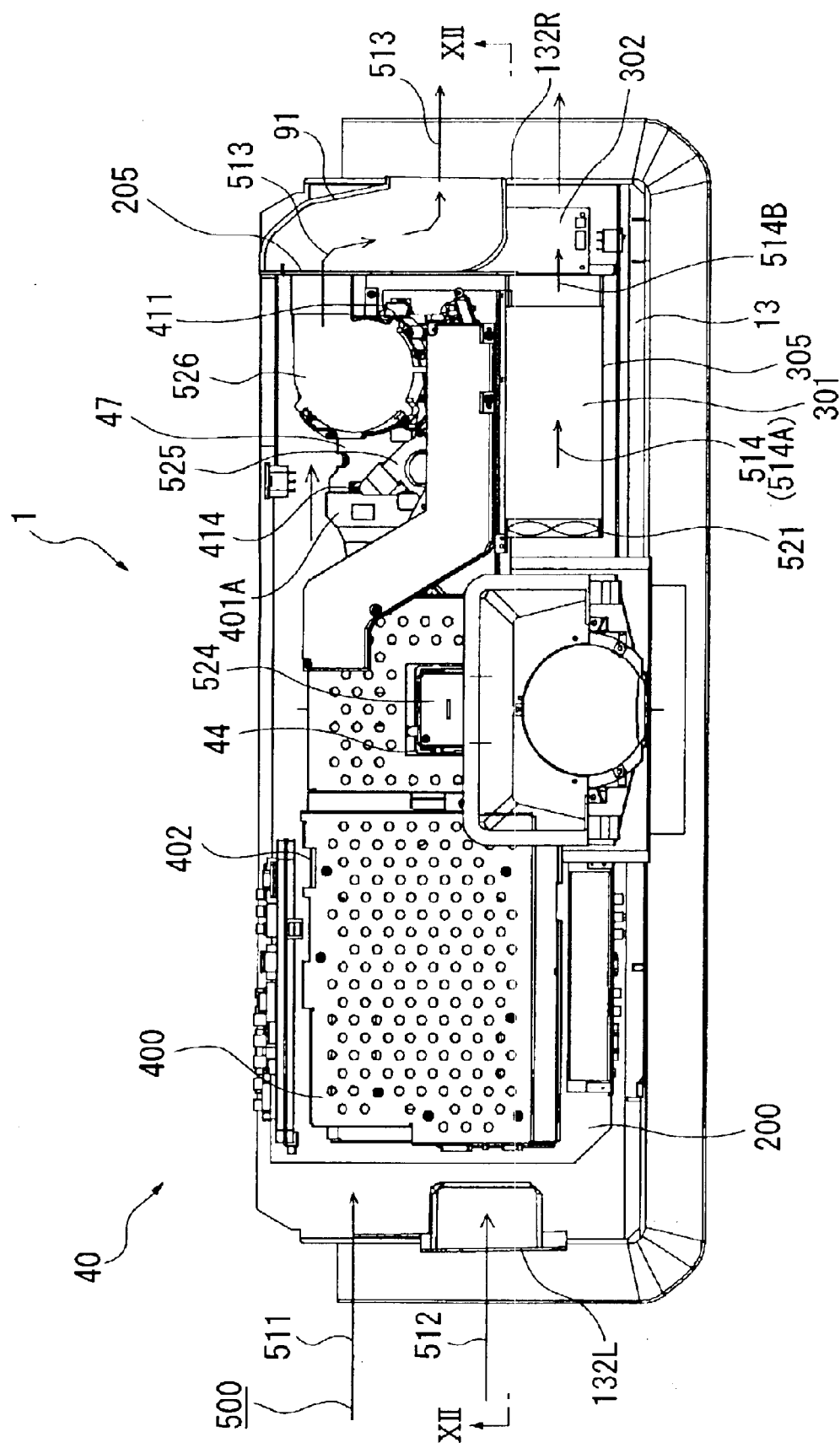
FIG. 11 is a plan view showing a rear projector according to the aforesaid embodiment.
Figure 12:
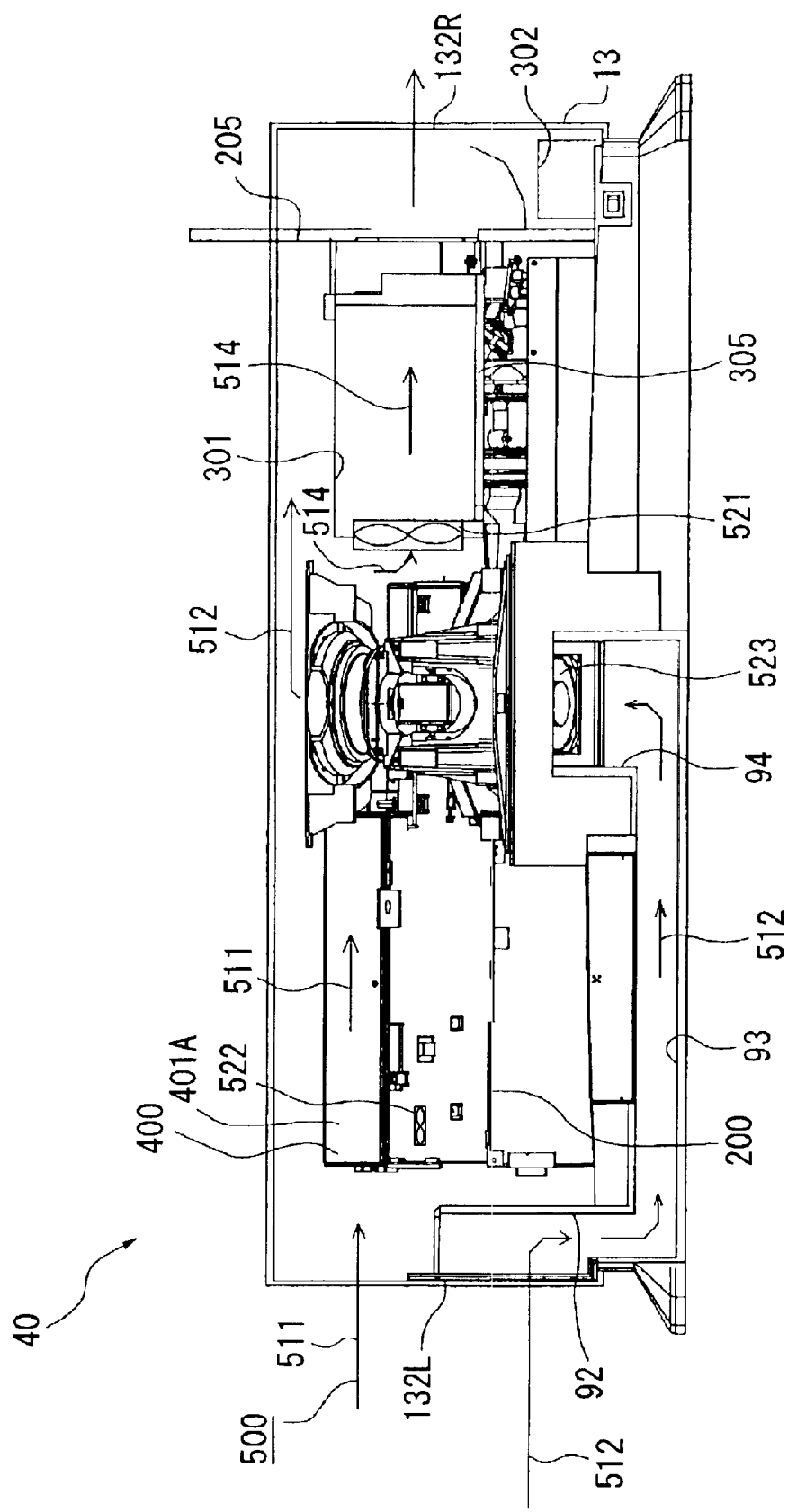
FIG. 12 is a vertical cross section taken along XII—XII line in FIG. 11.

FIG. 11 is a plan view showing the rear projector 1. FIG. 12 is a vertical cross section taken along XII—XII line in FIG. 11.

As shown in FIGS. 7, 11 and 12, the rear projector 1 is provided with an interior cooling area 500 for cooling the components 400, 200, 301 and 302 constituting the interior unit 40 and the inside of the cabinet 10. The interior cooling area 500 cools the entirety of the inside of the lower cabinet 13 including the interior unit 40.

As shown in FIGS. 11 and 12, the interior cooling area 500 introduces external cooling air from the intake opening 132L to the inside of the lower cabinet 13 to cool the respective components 400, 200, 301 and 302 inside the lower cabinet 13 and discharges the air having cooled the components from the exhaust opening 132R on the right side to the outside. In other words, a cooling channel for flowing the cooling air from the left side to the right side along the front side of the screen 51 is formed in the lower cabinet 13.

In the interior cooling area 500, as shown in FIGS. 11 and 12, a part of the external cooling air introduced from the intake opening 132L by axial-flow fans 522 and 523 is drawn in by the axial-flow fan 522 to cool the control board 402 while flowing along the control board cooling channel 511. A part of the rest of the cooling air is drawn by the axial-flow fan 523 and a sirocco fan 524 to flow in the optical device cooling channel 512 including the second to fourth ducts 92 to 94 to cool the optical device 44. The cooling air joins around the upper side of the optical device 44.

A first duct 91 disposed on the right side of the partition 205 extending in front and back direction is used in the light source cooling channel 513.

A part of the joined air is drawn by two sirocco fans 525 and 526 for cooling optical components as shown in FIG. 11, which flows in the light source cooling channel 513 in the light guide 47 to cool the polarization converter and the light source and subsequently flows in the first duct 91 to be discharged from the exhaust opening 132R to the outside.

On the other hand, the rest of the joined air is drawn by the axial-flow fan 521 to flow through the power source cooling channel 514 to cool the first power source 301 and the second power source 302, which is discharged from the exhaust opening 132R to the outside.

Two channels are provided as the exhaust channel for the air having cooled the components. The air having cooled the light source 411 is directly discharged to the outside through the dedicated first duct 91 without being in contact with the other components so as to avoid interference with the second power source 302.

1-5. Attitude Adjusting Mechanism of Optical Unit Body

Attitude adjusting mechanism of optical unit body 401A will be described below.

Figure 13:
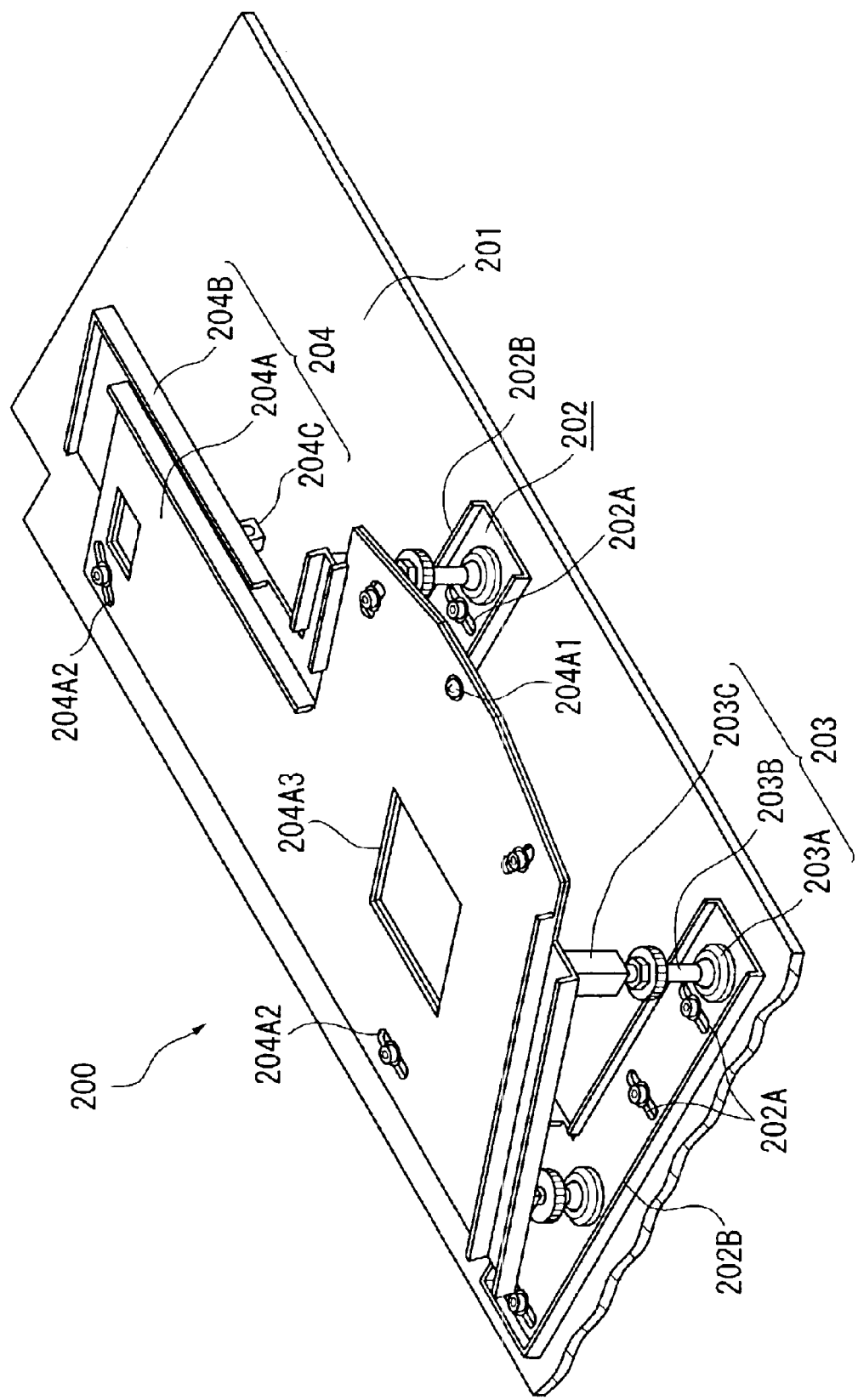
FIG. 13 is a perspective view showing a support member as an attitude adjuster seen from top side according to the aforesaid embodiment.

FIG. 13 is a perspective view showing the support member 200 as a support base seen from above.

The support member 200 adjusts the projection direction of the optical unit body 401A in order to project the optical image projected by the optical unit body 401A onto the backside of the screen 51 via the reflection mirror 30. The support member 200 has lateral position adjusters 202 as planar position adjusting mechanism provided on the base member 201 of the interior unit 40 in an opposing manner, an inclination adjuster 203 as an inclination adjusting mechanism vertically mounted on the lateral position adjusters 202, and a rotary position adjuster 204 as a rotation adjusting mechanism attached to the inclination adjuster 203 in a manner slanted to the rear side.

Though specific illustration is omitted, the lateral position adjuster 202 is a base of the inclination adjuster 203 and the rotation adjuster 204 for adjusting planar position of the entire support member 200. The lateral position adjuster 202 is constructed by an approximately planarly-viewed F-shaped plate body configured in accordance with the shape of the optical unit body 401A.

Track 202A of laterally elongated configuration disposed on a plurality of locations and a rising piece 202B formed by bending the outer circumference of the plate body are provided on the plate body.

The planar position of the optical unit body 401A is fixed by inserting a screw to the loose hole 202A to be screwed to a non-illustrated hole formed on the bottom surface of the lower cabinet.

In order to adjust the planar position of the optical unit body 401A, the screw inserted to the loose hole 202A is loosened and the rising piece 202B is held to move the lateral position adjuster 202 along the profile of the loose hole 202A, so that the optical unit body 401A is laterally moved, thereby adjusting planar position thereof.

Incidentally, though the loose hole 202A is laterally elongated in the present embodiment, the loose hole 202A may be elongated in front and back direction in order to move the optical unit body 401A in front and back direction or, alternatively, the loose hole 202A may be shaped in a cross extending both in lateral direction and front and back direction.

The inclination adjuster 203 adjusts inclination position of the optical unit body 401A in up-shift direction relative to the screen. The inclination adjuster 203 is fixed on the upper side of the lateral position adjuster, which includes a leg 203A for supporting the inclination adjuster 203, a column 203B supported by the leg 203A and vertically mounted on the upper side of the lateral position adjuster 202, and a movable metal fitting 203C connected to the distal end of the column 203B to be fixed to the rotary position adjuster 204.

Figure 14:
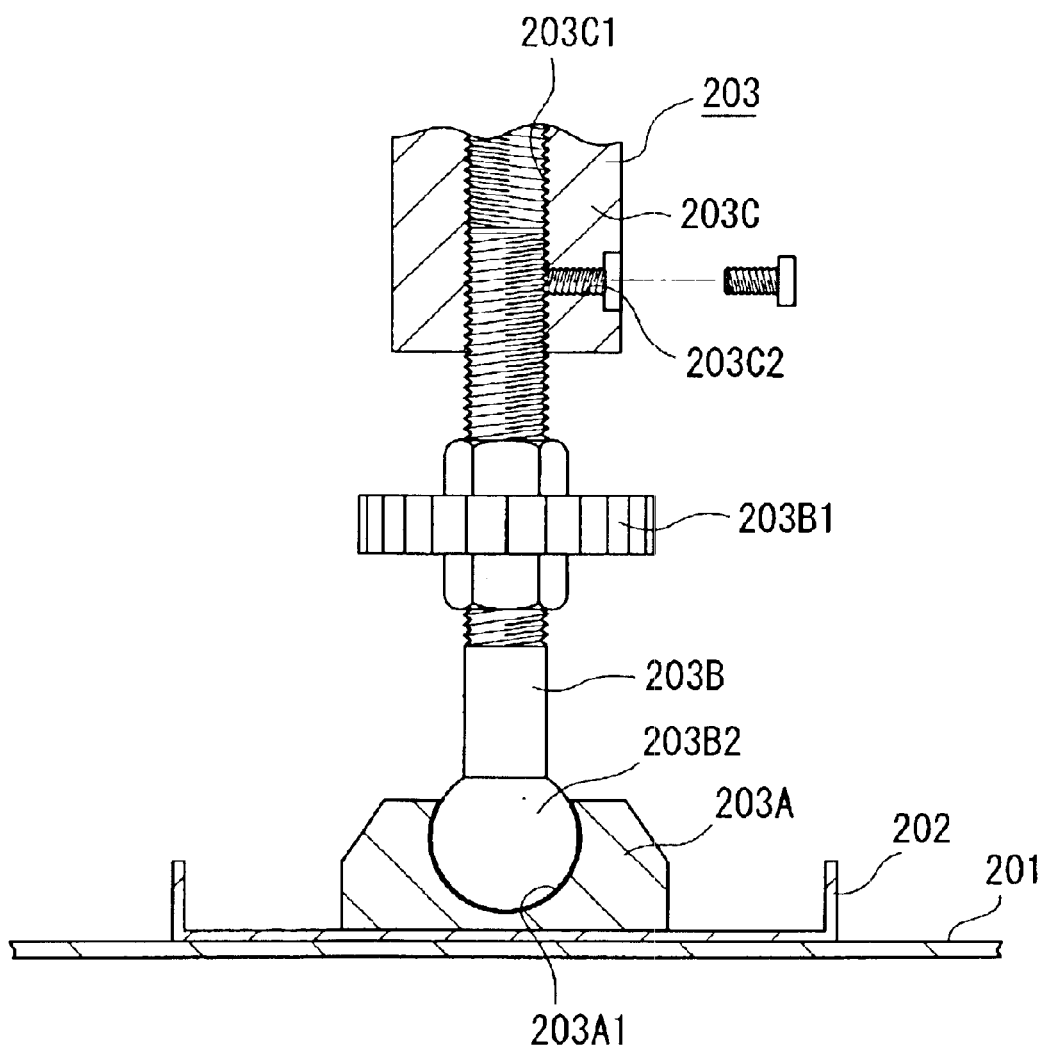
FIG. 14 is a cross section of an inclination adjuster according to the aforesaid embodiment.

FIG. 14 is a cross section of the inclination adjuster 203.

The column 203B is provided with a spherical body 203B formed approximately in a sphere at a base end thereof, the spherical body 203B being engaged with the leg 203A. External thread is formed at the distal end thereof to be screwed to the movable metal fitting 203C. A rotary knob 203B1 for allowing rotation of the column 203B is formed at the center thereof.

The leg 203A is provided with a concave portion 203A1 configured according to the shape of the spherical body 203B2. The leg 203A is screwed and fixed to the lateral position adjuster 202.

The movable metal fitting 203C is an approximately square pillar, in which a vertically penetrating hole 203C1 and a fixing hole 203C2 piercing the side of the movable metal fitting 203C to the hole 203C1 are formed.

A threaded hole for the distal end of the column 203B to be screwed is formed on the inner circumference of the hole 203C1, so that the movable metal fitting 203C is advanced and retracted in longitudinal direction of the column 203B according to screwing amount relative to the column 203B.

A screw is inserted to the fixing hole 203C2 to fix screwing of the movable metal fitting 203C and the column 203B, thereby fixing the inclination position of the optical unit body 401A relative to the screen 51 in up-shift direction.

Though specific illustration is omitted, the above-described inclination adjuster 203 is provided on four locations of respective ends and bent corner of the lateral position adjuster of approximately planarly-viewed F-shape.

In order to adjust the inclination position of the optical unit body 401A, the rotary knob 203B1 of the inclination adjuster 203 is rotated to change screwing amount of the distal end of the column 203 and the movable metal fitting 203C to advance and retract the movable metal fitting 203C in the longitudinal direction of the column 203B. The operation is conducted on the four inclination adjusters 203 disposed on the lateral position adjuster 202, so that the inclination position of the rotary position adjuster 204 on which the optical unit body 401A is fixed can be adjusted, thereby adjusting the inclination position of the optical unit body 401A in up-shift direction relative to the screen 51.

When the four inclination adjusters 203 are adjusted one by one in adjusting the inclination position, since only one of the movable metal fittings 203C is advanced and retracted relative to the unadjusted three inclination adjusters 203, the angle of the respective inclination adjuster 203 relative to the lateral position adjuster 202 has to be set variable. As described above, since the base end of the column 203B is provided with the spherical body 203B2 of approximate sphere, which is engaged with the concave portion 203A1 of the leg 203A formed in accordance with the shape of the spherical body 203B.

In other words, the inclination position of the optical unit body 401A can be adjusted not only in up-shift direction relative to the screen 51 but also in torsional (twist) direction.

As shown in FIG. 13, the rotary position adjuster 204 adjusts the position of the optical unit body 401A in rotary direction on a plane. The rotary position adjuster 204 has a rotary member 204A for the optical unit body 401A to be fixed, a rotary base member 204B engaged with the rotary member 204A and connected with the inclination adjuster 203, and an adjusting portion 204C connected with the rotary member 204A and the rotary base member 204B.

The rotary member 204A is a plate configured substantially identical with the optical unit body 401A having approximately planarly-viewed L-shaped configuration, on which the optical unit body 401A is mounted. The rotary member 204A has a rotation center 204A1 engaging with the rotary base member 204B to be the rotation center of the rotary member 204A, and a rotation guide 204A2 remote from the rotation center 204A1 to be engaged with the rotary base member 204B. An opening 204A3 of approximate rectangle is formed on the rotary member 204A for circulating cooling air to the optical unit body 401A.

A fourth duct 94 is provided in the opening 204A3 as a cooling channel for circulating cooling air to the optical device.

The optical unit body 401A and the rotary member 204A are fixed by inserting a screw in fixing hole 471A (FIG. 9) formed on the outer circumference of the lower light guide 471 to be screwed to a non-illustrated hole formed on the rotary member 204A.

As described above, the boss is screwed on the upper side of the rotary member 204A by which the projection lens 46 of the optical unit body 401A is supported.

The rotation center 204A1 is a hole penetrating both sides of the rotary member 204A, where the rotary member 204A and the rotary base member 204B are engaged by inserting a screw to the hole and a non-illustrated hole formed on the rotary base member 204B, so that the rotary member 204A can be rotated on the rotary base member 204B around the rotation center 204A1.

The rotation center 204A1 is formed on the main optical axis of the light beam irradiated by the projection lens 46 of the optical unit body 401A mounted on the rotary member 204A.

The rotary guide 204A2 is a track hole penetrating both sides of the rotary member 204A formed in rotary direction around the rotation center 204A1, which is engaged with a screw screwed and fixed on the rotary base member 204B to guide the rotary member 204A.

Since the rotary member 204A and the rotary base member 204B are not only connected by the rotation center 204A1 but also by the rotation guide 204A2, the rotary member 204A can be supported more securely by the rotary base member 204B and the rotary member 204A can be rotated more smoothly relative to the rotary base member 204B.

The rotary base member 204B engages with the rotary member 204A to support the rotation of the rotary member 204A, which is slightly larger than the rotary member 204A.

A non-illustrated hole is formed on the rotary base member 204B corresponding to the rotation center 204A1 and the rotation guide 204A2 of the rotary member 204A, and a non-illustrated opening to be a cooling channel of cooling air is formed on the rotary base member 204B corresponding to the opening 204A3 of the rotary member 204A.

A non-illustrated hole is formed corresponding to the position of the below-described adjusting portion 204C.

A movable metal fitting 203C of the above-described inclination adjuster 203 is fixed to the lower side of the rotary base member 204B, so that the inclination position of the rotary base member 204B changes in accordance with advancement and retraction of the movable metal fitting 203C.

The adjusting portion 204C rotates the rotary member 204A relative to the rotary base member 204B. The adjusting portion 204C is disposed on the lower side of the rotary base member 204B and the rotary member 204A and on a surface remote from the position of the projection lens 46 and extending toward the light source 411.

Figure 15:
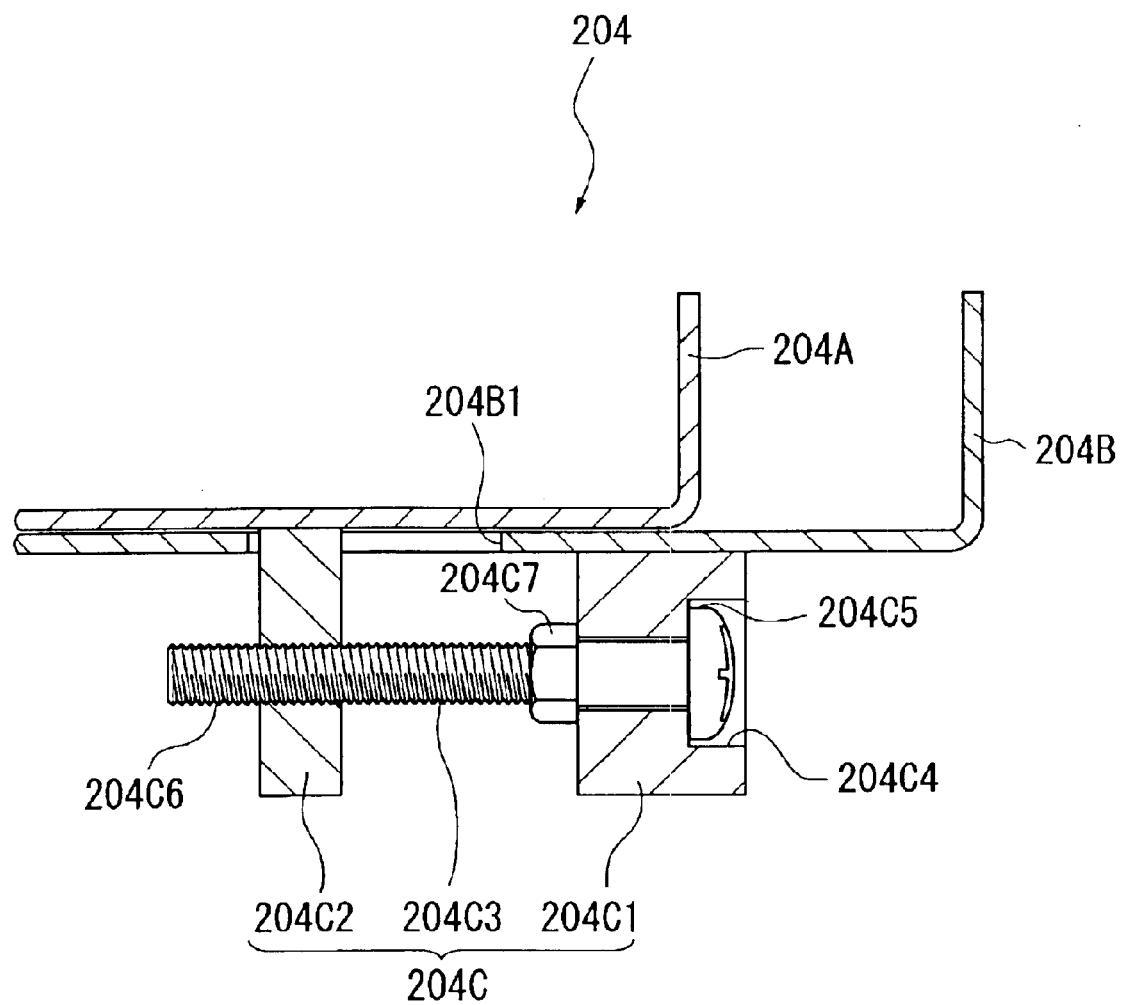
FIG. 15 is a cross section showing a rotation adjusting mechanism of an adjusting portion of the inclination adjuster according to the aforesaid embodiment.

FIG. 15 is a cross section showing rotation adjusting mechanism of the adjusting portion 204C.

The adjusting portion 204C has a fixed portion 204C1 fixed on the lower side of the rotary base member 204B, a movable portion 204C2 fixed to the lower side of the rotary member 204A and a rotation adjusting screw 204C3 connecting the fixed portion 204C1 and the movable portion 204C2.

The fixed portion 204C1 and the movable portion 204C2 are disposed in parallel in the front and back direction of the optical unit body 401A. When the rotary member 204A is disposed on the rotary base member 204B, the movable portion 204C2 is inserted to the hole 204B1 formed on the rotary base member 204B.

The fixed portion 204C1 is an approximately square pillar, on which a stepped hole 204C4 penetrating both sides of the fixed portion 204C1 in front and back direction of the optical unit body 401A is formed.

The rotation adjusting screw 204C3 is inserted to the hole 204C4, so that a screw-receiving surface 204C5 of the hole and rotary end of the rotation adjusting screw 204C3 are abutted.

The movable portion 204C2 is of approximately square pillar similar to the fixed portion 204C1, on which a hole 204C6 penetrating the sides of the movable portion 204C2 of the optical unit body 401A in front and back direction is formed.

The hole 204C6 is provided with a threaded hole corresponding to the external thread of the rotation adjusting screw 204C3 for the rotation adjusting screw 204C3 to be screwed.

The rotation adjusting screw 204C3 is provided with an external thread at a portion projecting from the fixed portion 204C1 when the rotation adjusting screw 204C3 is inserted to the hole 204C4 of the fixed portion 204C1.

A nut 204C7 is fixed to an end of the external thread formed from the distal end of the rotation adjusting screw 204C3, thereby forcing the rotation adjusting screw 204C3 to the fixed portion 204C1.

Since the rotation adjusting screw 204C3 is thus forced, the rotation adjusting screw 204C3 does not move in front and back direction relative to the fixed portion 204C1.

When the rotation of the optical unit body 401A is adjusted, the rotation adjusting screw 204C3 inserted to the fixed portion 204C1 of the rotary position adjuster 204 is rotated by a screwdriver etc. Then, the movable portion 204C2 advances and retracts in the longitudinal direction of the rotation adjusting screw 204C3 in accordance with change in the screwing amount of the rotation adjusting screw 204C3 and the movable portion 204C2. In other words, the rotary member 204A turns on the rotary base member 204B around the rotation center 204A1. Accordingly, the optical unit body 401A turns on the rotary base member 204B together with the rotary member 204A, thus adjusting the rotation of the optical unit body 401A.

According to thus-constructed support member 200, the attitude of the optical unit body 401A can be adjusted in lateral direction, inclination direction and rotary direction relative to the upper side of the base member 201 of the interior unit 40.

1-6. Holding Structure of Reflection Mirror

Next, holding structure of the reflection mirror 30 according to the present invention will be described below.

The reflection mirror 30 reflects the optical image projected from the optical unit body 401A toward the screen 51. The reflection mirror 30 is held by a mirror holder 31 formed on the rear side 17 of the upper cabinet 12. The reflection surface of the reflection mirror 30 is slanted downward while being held.

As shown in FIG. 8, the mirror holder 31 holds the reflection mirror 30 with a predetermined gap retained from the projection lens 46 (FIG. 7) of the optical unit body 401A and adjusts the aspect ratio of the displayed image projected on the screen 51. The mirror holder 31 has a mirror attitude adjuster 32 for supporting a long side of approximately trapezoidal reflection mirror 30, a mirror receiver 33 supporting oblique side of the reflection mirror and a mirror support 34 supporting the short side of the reflection mirror 30.

Figure 16:
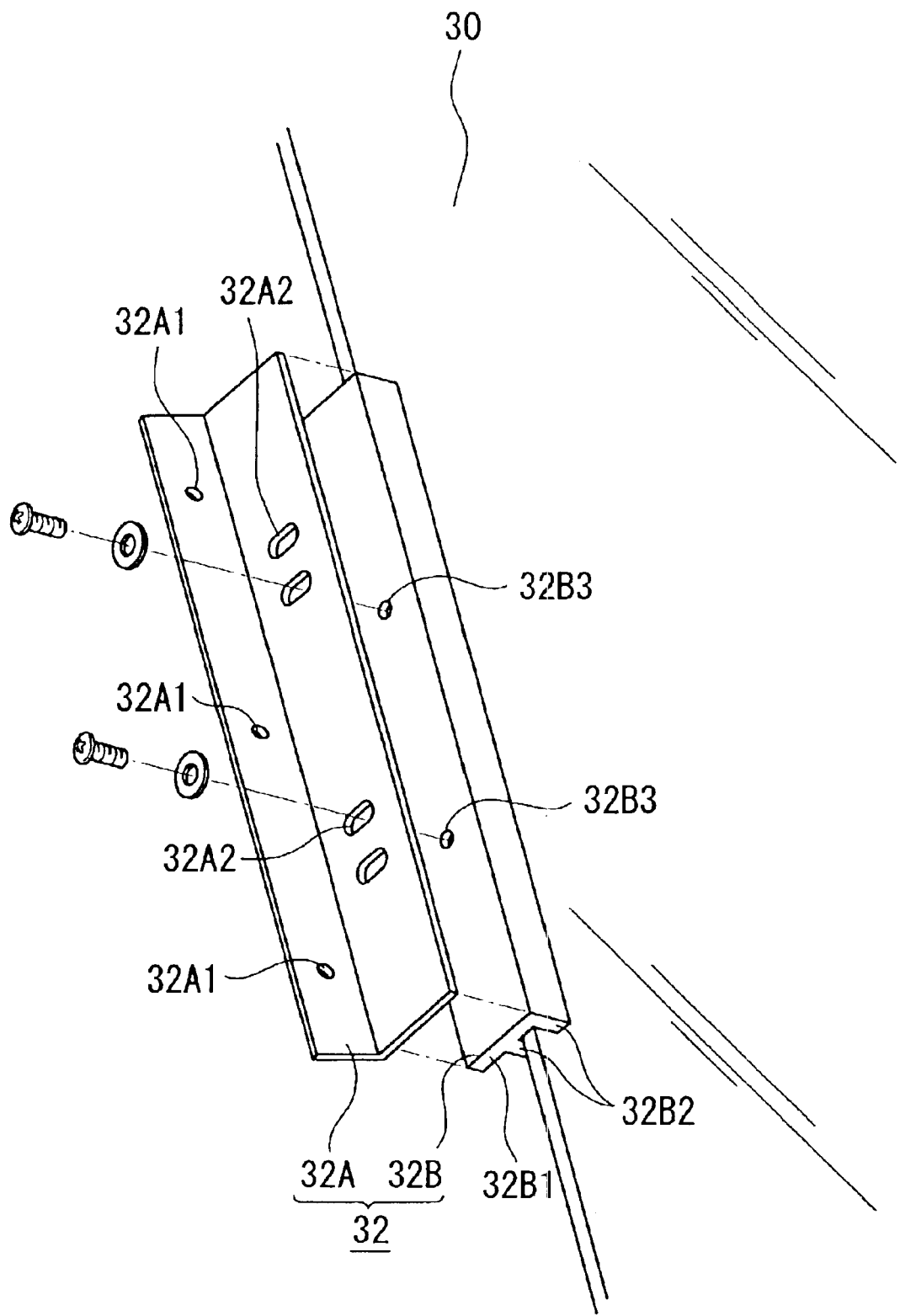
FIG. 16 is an exploded perspective view of a mirror angle adjuster according to the aforesaid embodiment.

FIG. 16 shows an exploded perspective view of the mirror attitude adjuster 32.

Figure 17:
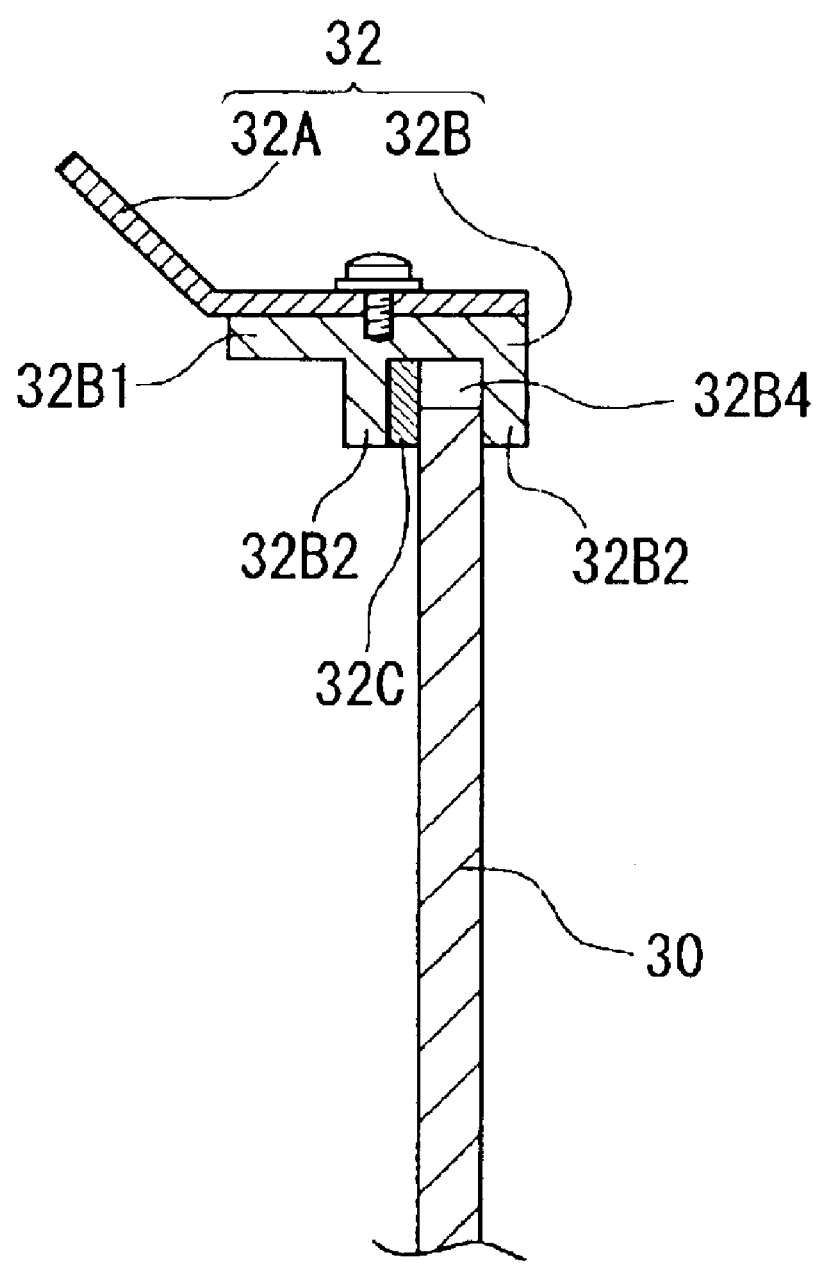
FIG. 17 is a cross section of a mirror angle adjuster according to the aforesaid embodiment.

FIG. 17 shows a cross section of the mirror attitude adjuster 32.

As shown in FIG. 16, the mirror attitude adjuster 32 supports the long side of the reflection mirror 30 so that the mirror attitude adjuster 32 is vertically movable relative to the reflection surface. The mirror attitude adjuster 32 has a fixed portion 32A connected to the rear side 17 of the upper cabinet 12, a holding portion 32B freely fitted to the fixed portion 32A and holding the long side of the reflection mirror 30.

The fixed portion 32A is formed in approximately L-shaped cross section and is provided with holes 32A1 to be connected with holes formed on the rear side 17 of the upper cabinet 12 on one of the surfaces thereof and holes 32A2 to be connected with the holding portion 32B on the other surface.

The hole 32A2 to be connected with the holding portion 32B is a loose hole elongated in a direction away from the upper cabinet, where a screw is inserted to the hole 32A2 and a hole formed on the below-described holding portion 32B to fix the fixed portion 32A and the holding portion 32B.

The holding portion 32B is constructed by a plate body 32B1 and two support pieces 32B2 vertically mounted on the plate body 32B1, the holding portion 322B having a cross section of approximate F-shape.

A hole 32B3 to be connected with the hole 32A2 formed on the fixed portion 32A is formed on the plate body 32B1.

As shown in FIG. 17, an end of the reflection mirror 30 is held between the two support pieces 32B2 as a support groove and a gap 32B4 is formed between the edge of the reflection mirror 30 and the plate body 32B1.

An elastic member 32C is attached to one of the support piece 32B2 located on the side of the upper cabinet. When the edge of the reflection mirror 30 is held by the support piece 32B2, the elastic member 32C is in contact with the side opposite to the reflection surface of the reflection mirror 30.

The attitude of the reflection mirror 30 is adjusted using the above-described mirror attitude adjuster 32 by loosening the screw screwed to the hole 32A2 of the fixed portion 32A and the hole 32B3 of the holding portion 32B and moving the holding portion 32B relative to the fixed portion 32A in a elongated direction of the hole 32A2 of the fixed portion 32A, i.e. in a vertical direction relative to the reflection surface of the reflection mirror 30.

When the holding portion 32B is moved relative to the fixed portion 32A in adjusting the attitude of the reflection mirror 30, the edge of the reflection mirror 30 abuts to the edge of the support piece 32B2, so that torsion of the reflection mirror 30 can be restrained and the reflection mirror is adjusted only in up-shift direction.

Further, since the side opposite to the reflection surface of the reflection mirror 30 abuts to the elastic member 32C, the difference between the inclination angle of the reflection mirror 30 and the angle of support piece 32B2 from the plate body 32B1 can be absorbed by physical deformation of the elastic member 32C, so that the edge of the reflection mirror 30 can be constantly abutted to the support piece 32B2 by virtue of the pressing force of the elastic member 32C.

As shown in FIG. 8, the mirror angle adjuster 32 is formed on three locations on the long side of the reflection mirror 30 to adjust the attitude of the reflection mirror 30.

Incidentally, though the mirror attitude adjuster 32 is formed on three positions of the long side of the reflection mirror 30, the mirror attitude adjuster 32 may be located on one or two positions for adjusting the attitude of the mirror.

Figure 18:
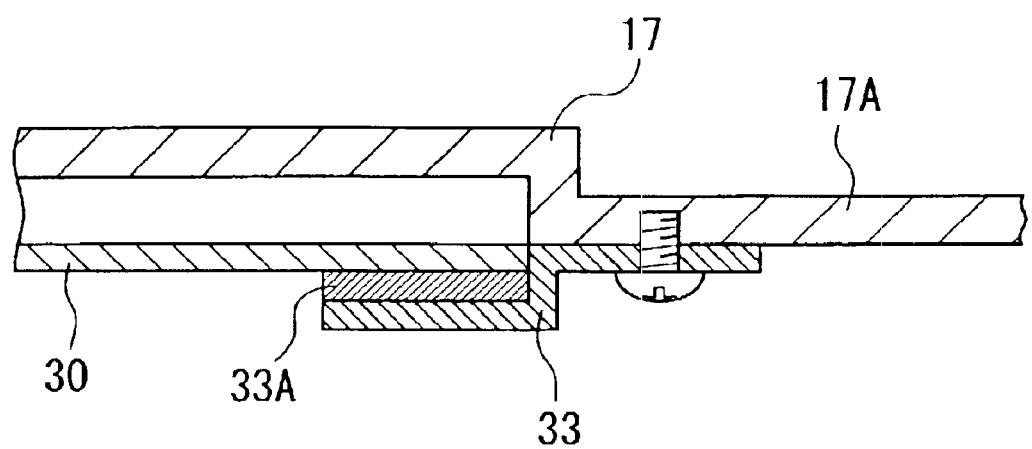
FIG. 18 is a cross section showing a holding mechanism of a reflection mirror by a mirror receiver according to the aforesaid embodiment.

FIG. 18 is a cross section showing holding mechanism of the reflection mirror 30 by the mirror receiver 33.

The mirror receiver 33 holds the self-weight of the reflection mirror 30, which is located on the oblique side of the reflection mirror 30 and is disposed at a boss 17A protruding from the rear side 17 of the upper cabinet 12.

In FIG. 18, vertical direction shows the inclination direction of the reflection mirror, and the lower side of the reflection mirror corresponds to the reflection surface.

The mirror receiver 33 has approximate Z-shaped cross section, of which one end is fixed to the boss 17A and the other end abuts to the reflection mirror 30.

An elastic member 33A is attached to the side of the mirror receiver 33 abutting to the reflection mirror 30, so that the elastic member 33A is interposed between the mirror receiver 33 and the reflection mirror.

Since the elastic member 33A is interposed, the elastic member 33A is elastically deformed in accordance with adjustment of the attitude of the reflection mirror 30 by the mirror attitude adjuster 32, thereby responding to the inclination of the reflection mirror 30.

As shown in FIG. 8, two mirror receivers 33 are respectively formed on the oblique sides of the reflection mirror to avoid distortion due to self-weight of the reflection mirror 30.

Incidentally, though two mirror receivers 33 are provided respectively on the oblique side of the reflection mirror, only one mirror receiver 33 may be provided thereto.

Figure 19:
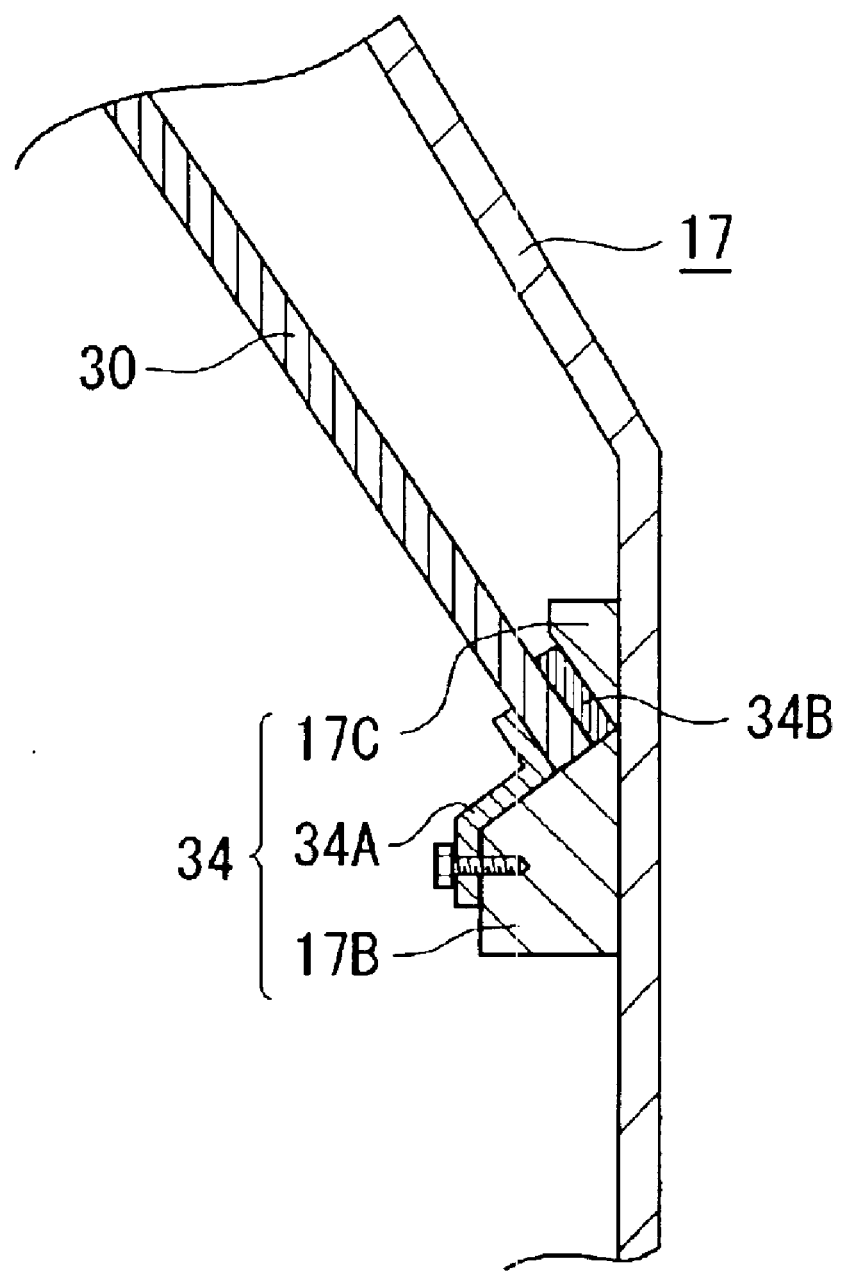
FIG. 19 is a cross section showing a holding mechanism of a reflection mirror by a mirror support according to the aforesaid embodiment.

FIG. 19 is a cross section showing holding mechanism of the reflection mirror 30 by the mirror support 34.

The mirror support 34 responds to the attitude adjustment of the reflection mirror 30 by the mirror attitude adjuster 32 and holds the self-weight of the reflection mirror 30. The mirror support 34 projects from the rear side 17 of the upper cabinet 12, and includes a first boss 17B supporting an edge of the reflection mirror 30, a mirror stopper 34A for holding the reflection surface of the reflection mirror 30, and a second boss 17C protruding from the rear side 17 of the upper cabinet 12 to be abutted to the side opposite to the reflection surface of the reflection mirror 30.

The first boss 17B is of approximate trapezoidal configuration, where an edge of the reflection mirror 30 is abutted to the oblique side of the trapezoid.

The mirror stopper 34A prevents shift in the abutting position of the end of the reflection mirror and the oblique side of the first boss 17B due to the self-weight of the reflection mirror or the attitude adjustment of the reflection mirror. The mirror stopper 34A has approximate Z-shaped cross section, of which one of the bent portion corresponds to the bent portion of the first boss 17B and the other bent portion corresponds to the corner formed by the oblique side of the first boss 17B and the reflection mirror.

The second boss 17C has an approximately triangle cross section, which prevents shift in the abutting position between the edge of the reflection mirror 30 and the oblique side of the first boss 17B. An elastic member 34B is attached to the abutting surface against the reflection mirror 30.

The elastic member 34B elastically deforms in accordance with adjusting the attitude of the reflection mirror 30 and prevents abutting position shift of the edge of the reflection mirror 30 and the oblique side of the first boss 17B by the pressing force against the reflection mirror 30.

1-7. Effect of First Embodiment

According to the above-described embodiment, following advantages can be obtained.

(1) Since the optical unit is provided with the support member 200 having a lateral position adjuster 202, an inclination adjuster 203 and the rotary position adjuster 204, the attitude of the optical unit for projecting the image can be adjusted by three axes. Accordingly, undisplayable area of the projected image to the screen can be narrowed in adjusting the display position of the image projected by the optical unit on the screen.

Therefore, even when aspect ratio of the displayed image is changed due to difference in the tolerance of the cabinet 10 of the rear projector 1 and the tolerance of the components installed in the cabinet 10 to cause projection dispersion on the image displayed on the screen, optimization is possible by adjusting the attitude of the optical unit body 401A by the support member 200, thereby displaying the image on the entire screen.

(2) Since the optical unit body 401A is inclined in up-shift direction relative to the screen, the dimension of the rear projector 1 in a direction away from the screen, i.e. the thickness, can be reduced, thereby reducing the volume of the projector.

(3) Since the lateral position adjuster 202 is disposed on the support plate of the interior unit and has the loose hole 202A and the rising piece 202B, the optical unit body 401A can be moved in right and left direction of the support plate by loosening the screw inserted to the loose hole 202A, holding the rising piece 202B and moving the lateral position adjuster 202 relative to the support plate.

Accordingly, the planar position adjustment of the optical unit body 401A can be easily conducted and the influence of external force applied to the optical unit body 401A in adjusting the planar position of the optical unit body 401A can be mitigated, thereby preventing mutual position shift of the respective optical systems in the optical unit body 401A and projecting stable image having no change in aspect ratio of the image.

(4) Since the rotary position adjuster 204 has the rotary member 204A, the rotary base member 204B and the adjusting portion 204C, and the rotary member 204A rotates on the rotary base member 204B around the rotation center 204A1 while the rotation center 204A1 of the rotary member 204A and the rotation guide 204A2 engage with the rotary base member 204B, the rotation of the optical unit body 401A can be easily adjusted, thereby adjusting the position of the image displayed on the screen.

(5) Since the rotary position adjuster 204 is constructed by the rotary member 204A and the rotary base member 204B, the rotation of the optical unit body 401A is adjusted by rotating the rotary member 204A relative to the rotary base member 204B as in the lateral position adjuster 202, so that the influence of external force applied to the optical unit body 401A in adjusting the rotary position of the optical unit body 401A can be mitigated, thereby preventing mutual position shift of the respective optical system in the optical unit body 401A and projecting stable image having no change in aspect ratio thereof.

(6) Since the rotation center 204A1 of the rotary member 204A is formed on the main optical axis of the light beam irradiated by the optical unit body 401A, when the rotary member 204A is rotated relative to the rotary base member 204B, the optical unit body 401A can be rotated around a rotation center of the irradiated main optical axis, i.e. the displayed image projected on the screen can be rotated around the illumination optical axis of the displayed image, so that the planar movement of the image displayed on the screen can be restrained, thereby easily adjusting the rotation of the displayed image.

Accordingly, the planar position adjustment of the optical unit body 401A is not necessary after adjusting the rotation of the optical unit body 401A, thus improving operation efficiency.

(7) Since the rotary member 204A and the rotary base member 204B are connected by the adjusting portion 204C, the rotary member 204A can be moved relative to the rotary base member 204B by rotating the rotation adjusting screw 204C3 of the adjusting portion 204C by a screwdriver etc.

(8) Since the rotation of the optical unit body 401A can be conducted by the adjusting portion 204C, the rotation of the optical unit body 401A can be accurately adjusted within minute range.

(9) The inclination adjuster 203 has the leg 203A, the column 203B and the movable metal fitting 203C and advances and retracts the movable metal fitting 203C along the longitudinal direction of the column 203B by changing screwing amount of the distal end of the column 203B and the movable metal fitting 203C with the lateral position adjuster 202 and the rotary base member 204B of the rotary position adjuster 204 being connected, i.e. moves the rotary base member 204B relative to the lateral position adjuster 202. Accordingly, the inclination attitude of the optical unit body 401A can be adjusted in accordance with the change in the screwing amount of the distal end of the column 203B and the movable metal fitting 203C.

(10) Since the base end of the column 203B of the inclination adjuster 203 has the spherical body 203B2 which is engaged with the leg 203A having the concave portion 203A1 shaped corresponding to the spherical body 203B2, when only one of the four inclination adjusters 203 is adjusted, so that the inclination of the optical unit body 401A can be adjusted by changing the engagement of the spherical body 203B2 of the column 203B and the leg 203A even when the optical unit body 401A is located in distorted manner relative to mere inclination thereof.

(11) Since the rotary position adjuster 204 is disposed on the base member 201 in an inclined manner and the optical unit body 401A is supported on the support rotary position adjuster 204, the optical unit body 401 A can be securely supported in accordance with attitude adjustment of the optical unit body 401A.

Accordingly, even when the aspect ratio of the displayed image is changed by the difference in the tolerance of the cabinet 10 of the rear projector and the tolerance of components installed inside the cabinet 10 to cause projection dispersion on the image displayed on the screen, optimization is possible by adjusting the attitude of the reflection mirror 30 by the mirror attitude adjuster 32, thereby displaying the image on the entire screen.

(13) Since the reflection mirror is formed in approximate trapezoid which works minimum in accordance with the aspect ratio of the image projected by the optical unit body 401A, the size and weight of the reflection mirror 30 can be reduced while sufficiently working as the reflection mirror, thereby achieving size and weight reduction of the rear projector 1.

(14) Since the holding portion 32B of the mirror attitude adjuster 32 is constructed by the plate body 32B1 and two support pieces 32B2 vertically mounted on the plate body 32B1 and the gap 32B4 is formed between the reflection mirror 30 and the plate body 32B1 when the reflection mirror 30 is held between the two support pieces 32B2, the edge of the reflection mirror 30 does not collide with the plate body 32B1 of the holding portion 32B, thereby avoiding locally applying external force on the edge of the reflection mirror 30.

Accordingly, the attitude of the reflection mirror 30 can be smoothly adjusted by the mirror attitude adjuster 32, and since the external force is not applied to the edge of the reflection mirror 30, distortion of the reflection mirror 30 caused by external force can be avoided and projection dispersion of the image displayed on the screen can be mitigated.

(15) In the holding portion 32B of the mirror attitude adjuster 32, since the elastic member 32C is attached to the support piece 32B2 located on the side of the upper cabinet and the elastic member 32C abuts to the side of the reflection mirror 30 opposite to the reflection surface thereof, the damage on the edge of the reflection mirror caused by the friction between the support piece 32B2 and the reflection mirror 30 in accordance with adjustment of the attitude of the reflection mirror 30 can be mitigated.

(16) Since the elastic member 32C is attached to the support piece 32B2 located on the side of the upper cabinet, the elastic member 32C presses the side of the reflection mirror 30 opposite to the reflection surface thereof and the reflection surface of the reflection mirror 30 abuts to the other support piece 32B2. The attitude of the reflection mirror 30 can be adjusted interlocking with the movement of the holding portion 32B keeping abutment of the reflection surface with the support piece.

Accordingly, there is no distortion on the reflection mirror 30—in accordance with adjustment of the attitude of the reflection mirror 30, thereby accurately maintaining the inclination of the reflection mirror 30.

(17) Since the mirror holder 31 has the mirror receiver 33 supporting the oblique side of the reflection mirror 30 and the mirror receiver 33 supports the reflection surface of the reflection mirror 30, the self-weight of the reflection mirror 30 can be supported by the mirror receiver 33, so that the deformation of the reflection mirror 30 such as distortion caused by the self-weight of the reflection mirror 30 can be prevented, thus avoiding change in the aspect ratio of the image displayed on the screen caused by the deformation and mitigating the projection dispersion.

(18) Since the elastic member 33A is attached to the surface of the mirror receiver 33 abutting to the reflection surface of the reflection mirror 30, the edge of the reflection mirror 30 can be supported by the elastic deformation of the elastic member 33A in adjusting the attitude of the reflection mirror 30 by the mirror attitude adjuster 32.

Accordingly, the edge of the reflection mirror 30 can be supported by the elastic deformation of the elastic member 33A in accordance with the inclination of the reflection mirror 30 and the restriction of the inclination of the reflection mirror 30 by the fixed mirror receiver 33 can be avoided.

(19) Since the mirror support 34 has the first boss 17B, the second boss 17C and the mirror stopper 34A, abutment position shift of the edge of the reflection mirror 30 from the first boss 17B caused by attitude adjustment of the reflection mirror 30 by the mirror attitude adjuster 32 and the self-weight of the reflection mirror 30, so that the reflection mirror 30 can be securely supported.

(20) Since the elastic member 34B is attached to the abutment surface of the second boss 17C against the reflection mirror 30, the elastic member 34B causes elastic deformation in accordance with attitude adjustment of the reflection mirror 30 and abutment position shift of the edge of the reflection mirror 30 against the oblique side of the first boss 17B can be prevented by the pressing force of the elastic member 34B against the reflection mirror 30.

Second Embodiment

Next, second embodiment of the present invention will be described below.

In the following description, the same reference numeral will be attached to the same structure or the same component as in the first embodiment to omit or simplify detailed explanation thereof.

In the first embodiment, the base member 201 is provided in the cabinet 10 and is in contact with the receiver surface 21 of the leg 20. The support member 200 is disposed on the base member 201 and the optical unit body 401A is supported by the support member 200.

On the other hand, the base member 201 is spaced apart from the receiver surface 21 of the leg 20 in the cabinet 10 in the second embodiment. The support member 200 is disposed on the lower side of the base member 201 and the optical unit body 401A is supported by the support member 200.

2-1. Attitude Adjusting Mechanism of Optical Unit Body

Figure 20:
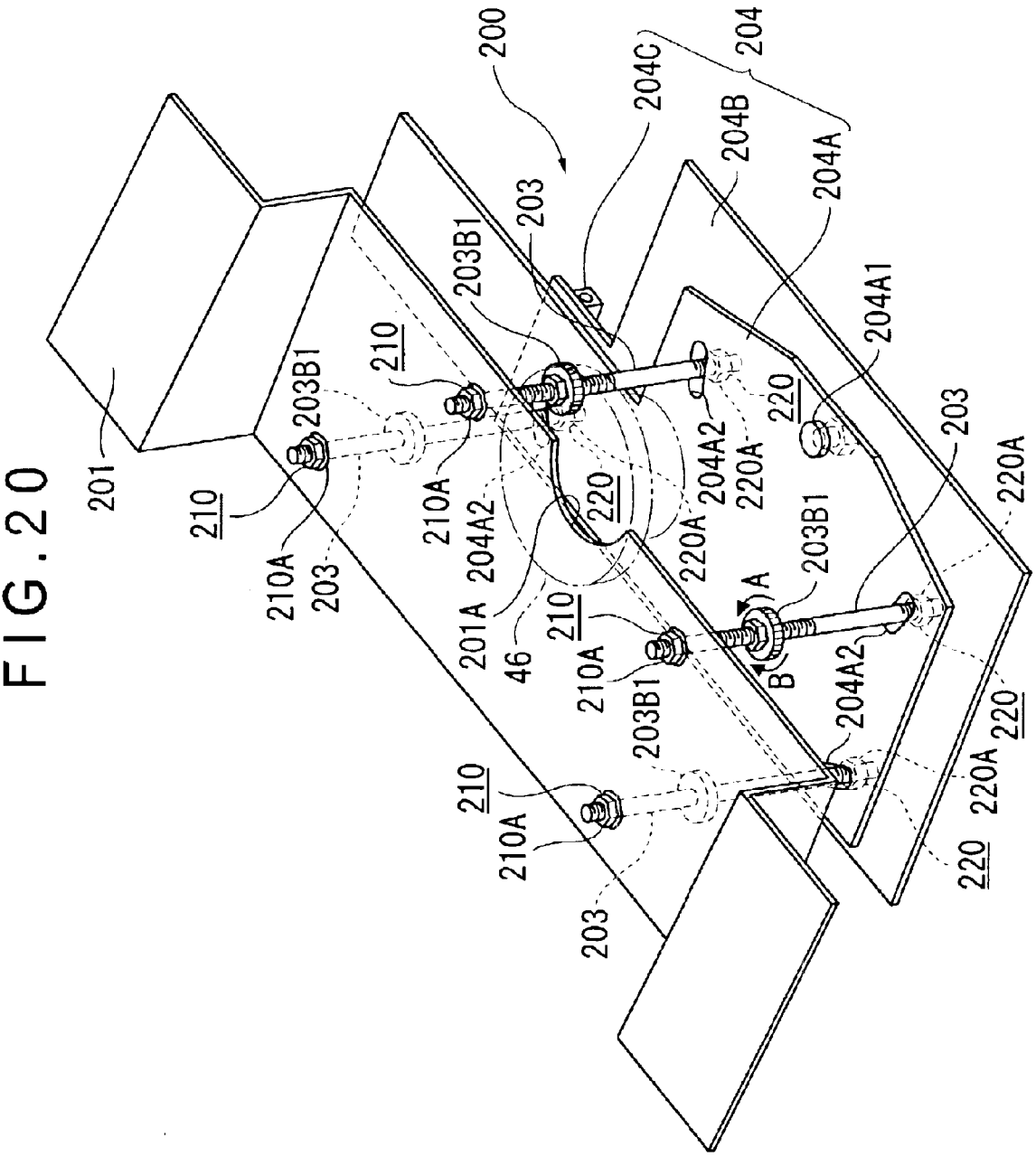
FIG. 20 is an illustration schematically showing positional relationship of a base member, a support member and an optical unit according to second embodiment.

FIG. 20 is an illustration schematically showing positional relationship of the base member 201, the support member 200 of the second embodiment and the optical unit 401 described in the first embodiment. Incidentally, in FIG. 20, the base member 201 and the support member 201 are seen from the front side of the rear projector 1. Further, in FIG. 20, in order to clarify the disposition of the base member 201 and the support member 200, the optical unit 401 is simplified and only the projection lens 46 constituting the optical unit 401 is shown in dotted line.

The base member 201 is constructed by metal plate body, which has convex cross section projecting downward.

Though not illustrated, both end surfaces of the lateral side of the base member 201 abut to the base member support projecting from the end surface of the lateral side 132 of the lower cabinet 13 in approximate normal line direction. In other words, the base member 201 is supported by the lateral sides 132 of the lower cabinet 13.

Further, a first screwing mechanism 210 extending toward the opposing support member 200 is provided on four positions of the end surface of the convex portion of the base member 201. The first screwing mechanism 210 extends in a direction approximately orthogonal with the receiver surface 21 of the leg 20. Incidentally, though various configurations are possible for the first screwing mechanism 210, a hole penetrating the convex portion is formed and a nut 210A is fixed to a position corresponding to the hole by welding etc. in the present embodiment.

Further, approximately arc-shaped notch 201A is formed on the edge of the convex portion. When the optical unit body 401A described in the first embodiment is mounted on the support member 200, the projection lens 46 of the optical unit body 401A is located at the position of the notch 201A.

The surface of the convex portion of the base member 201 is slanted downward toward rear side relative to the surface on both lateral sides.

The support member 200 is located on the lower side of the base member 201, which is provided with an inclination adjuster 203 and a rotary position adjuster 204.

The rotary position adjuster 204 has the rotary member 204A, the rotary base member 204b and the adjusting portion 204C as in the first embodiment.

The rotary base member 204B is provided with a second screwing mechanism 220 extending substantially in the same direction as the first screwing mechanism 210 of the base member 201 at the position corresponding to the rotation guide 204A2 of the rotary member 204A. Incidentally, though various arrangements are possible for the second screwing mechanism, the same structure as the first screwing mechanism is employed in the present embodiment.

In the present embodiment, four pairs of the first screwing mechanism and the second screwing mechanism are provided on a predetermined position of the base member 201 and the rotary base member 204B approximately along the normal line of the receiver surface 21 of the leg 20.

Incidentally, the rotary position of the optical unit body 401A is adjusted by the rotary position adjuster 204 in the same manner as the first embodiment and detailed description is omitted.

The inclination adjuster 203 has approximate column shape having an external thread corresponding to a threaded hole formed on the nut 210A of the first screwing mechanism 210 of the base member 201 on a first end and another external thread corresponding to the threaded hole formed on the nut 220A of the second screwing mechanism 220 on a second end thereof. The external thread on the first end and the external thread on the second end are inversely arranged. In the present embodiment, the external thread on the first end is right-hand thread and the external thread on the second end is left-hand thread. Incidentally, such arrangement is not limited, but the external thread on the first end may be left-hand thread and the external thread on the second end may be right-hand thread.

The first end of the inclination adjuster 203 is screwed to the first screwing mechanism 210 of the base member 201 and the second end thereof is screwed to the second screwing mechanism 220 of the rotary base member 204B. When the inclination adjuster 203 is screwed to the first screwing mechanism 210 and the second screwing mechanism 220, the inclination adjuster 203 is inserted to the rotation guide 204A2 of the rotary member 204A. At this time, the surface on the convex portion of the base member 201 is approximately parallel with the surface of the rotary position adjuster 204.

The rotary knob 203B1 is formed at approximately center of the inclination adjuster 203 as in the first embodiment.

In order to adjust the inclination position of the optical unit body 401A mounted on the support member 200, the rotary knob 203b1 of the inclination adjuster 203 is rotated and the screwing amount of the inclination adjuster 203 with the first screwing mechanism 210 and the second screwing mechanism 220 is changed, thus changing the position of the rotary position adjuster 204 relative to the base member 201. In the present embodiment, when the rotary knob 203B1 is rotated in the direction of arrow A in FIG. 20, the first end and the second end of the inclination adjuster 203 moves in a direction protruding from the first screwing mechanism 210 and the second screwing mechanism 220 relative to the base member 201 and the rotary position adjuster 204. In other words, the relative position between the base member 201 and the rotary position adjuster 204 comes close. On the other hand, when the rotary knob 203B1 is rotated in the direction of arrow B in FIG. 20, the relative position between the base member 201 and the rotary position adjuster 204 are spaced apart. The operation is conducted on the four inclination adjusters 203, thus adjusting inclination position of the rotary position adjuster 204 and inclination of the optical unit body 401A relative to the screen 51 in up-shift direction.

When the four inclination adjusters 203 are adjusted one by one, the base member 201 is relatively moved toward and away from the rotary base member 204B at the portion corresponding to the inclination adjuster 203 to be adjusted relative to the unadjusted three inclination adjusters 203. In other words, the inclination position of the rotary base member 204B in up-shift direction relative to the screen 51 is distorted. In the present embodiment, the load applied on the inclination adjuster 203 in accordance with distortion of the rotary base member 204B is absorbed by the clearance between the external thread formed on the first end and the second end of the inclination adjuster 203 and the internal thread formed on the first screwing mechanism 210 and the second screwing mechanism 220. In the present embodiment, in order to change the inclination of the optical unit body 401A by the inclination adjuster 203, the angle of the rotary base member 204B is changed within a range of 0.5 to 1.0 degree relative to the surface of the convex portion of the base member 201.

The arrangement other than the above-described base member 201 and the support member 200 is approximately the same as the first embodiment and approximately same arrangement as the first embodiment is used for cooling mechanism.

2-2. Effect of Second Embodiment

According to the above second embodiment, following advantages can be obtained as well as substantially identical advantages of the above (1), (2), (4) to (8) and (12) to (20).

(21) The optical unit 401 and the power source block 300 are located between the base member 201 and the rotary position adjuster 204 and are isolated in the lower cabinet 13 from the other components such as the screen 51 by the base member 201 and the rotary position adjuster 204. Accordingly, the base member 201 and the rotary position adjuster 204 work as a duct for guiding the cooling air in the internal cooling mechanism 500, thereby efficiently cooling the components in the optical unit 401 and the power source block 300. Further, since the cooling air circulates along the base member 201 and the rotary position adjuster 204, the base member 201 and the rotary position adjuster 204 can also work as a component for insulating heat to the screen 51 disposed in the upper cabinet 12.

(22) Since the surface of the convex portion of the base member 201 is slanted relative to the surface on the right and left sides, the support member 200 is inclined in advance when being mounted to the base member 201. Accordingly, by minutely adjusting the rotary knob 203B1 of the inclination adjuster 203, the inclination of the optical unit body 401A mounted on the support member 200 can be adjusted.

(23) Since the first screwing mechanism 210 and the second screwing mechanism 220 are respectively provided to the base member 201 and the rotary base member 204B and the inclination adjuster 203 is a component screwed to the first screwing mechanism 210 and the second screwing mechanism 220, the base member 201 and the rotary position adjuster 204 can be connected with a simple structure and the inclination of the rotary position adjuster 204 relative to the base member 201 can be changed with a simple structure.

3. Modification of Embodiments

Incidentally, the scope of the present invention is not restricted to the above-described embodiments, but includes modifications as shown below.

For instance, though the support member 200 is constructed by mounting the inclination adjuster 203 and the rotary position adjuster 204 on the lateral position adjuster 202 in the first embodiment, such arrangement is not limiting but the inclination adjuster and the lateral position adjuster may be mounted on the rotary position adjuster.

Further, though the inclination adjuster 203 has the leg 203A, the column 203B and the movable metal fitting 203C in the first embodiment, such arrangement is not limiting. For instance, other arrangement is possible, where the leg 203A is omitted and two movable metal fittings 203C are provided, one of the two metal fittings 203C being fixed to the rotary position adjuster 204 and the other being fixed to the lateral position adjuster 202, external groove is formed on both ends of the column 203B and the column 203B is screwed to the two movable metal fittings 203C. According to such arrangement, the inclination position can be adjusted by the inclination adjuster 203 with a simple structure without providing the leg 203A.

Further, the position of the leg 203A and the movable metal fitting 203C may be reversed in the first embodiment. In other words, the leg 203A may be provided on the rotary base member 204B and the movable fitting 203C may be provided on the lateral position adjuster 202. The inclination adjuster 203 may be designed in accordance with the shape of the support member 200.

Though the lateral position adjuster 202, the inclination adjuster 203 and the rotary position adjuster 204 are used for adjusting the attitude of the optical unit body 401A in the first embodiment, only the inclination adjuster 203 may be independently operated.

Though the support member 200 has the inclination adjuster 203 and the rotary position adjuster 204 in the second embodiment, such arrangement is not limiting. For instance, the lateral position 202 may be further provided as in the first embodiment. Further, inclination position may only be adjusted by providing the rotary base member 204B and the inclination adjuster 203.

A component for fixing screwing condition of the inclination adjuster 203 like the movable metal fitting 203C of the first embodiment may be provided in the second embodiment. According to such arrangement, the most appropriate inclination position of the optical unit body 401A can be maintained.

Though the external thread is formed on both ends of the inclination adjuster 203, such arrangement is not limiting. For instance, the external thread may be formed on only one of the two ends and the other end may be freely fitted to the base member 201 or the rotary base member 204B.

Though the cabinet 10 (lower cabinet 13) as a casing and the base member 201 as the support plate are independently constructed in the above-described embodiments, the lower side 134, the lateral side 132 and the upper side 133 of the cabinet 10 (lower cabinet 13) may be used as a support plate. In other words, the support member 200 is directly supported by the lower side 134, the lateral side 132 and the upper side 133. According to the above arrangement, the production cost and assembly time of the rear projector 1 can be reduced by omitting the number of components.

Though a rear projector using three optical modulators is taken as an example in the above respective embodiments, the present invention may be applied to a rear projector using only one optical modulator, a rear projector using two optical modulators and a rear projector using more than three optical modulators.

Though the liquid crystal panel is used as the optical modulator, an optical modulator other than liquid crystal such as a device using a micro-mirror may be used. In such arrangement, the polarization plate on the light emitting side can be omitted.

Though transmissive-type optical modulator having different light-incident side and the light-emitting side is used in the above embodiments, a reflective optical modulator having the same light-incident side and the light-emitting side may be used.

What is claimed is:

1. A rear projector, comprising:
   an image generator having an electric optical device that modulates a light beam irradiated by a light source and forms an optical image in accordance with image information and a projection optical system that enlarges and projects the optical image;
   a box-shaped casing that houses the image generator; and
   a screen exposed on one of the lateral sides of the box-shaped casing onto which the optical image generated by the image generator is projected,
   the casing having a base member that supports the image generator,
   the image generator being mounted on a support base, wherein the support base is secured to the base member by four securing devices each located at approximately a corner of the support base, the support base having a support surface inclined relative to the base member,
   the support base being provided with an inclination position adjusting mechanism that adjusts the inclination position of the image generator relative to the base member.

2. The rear projector according to claim 1, wherein the support base is disposed on the base member in an inclined manner.

3. The rear projector according to claim 1, wherein the support base is disposed on the lower side of the base member in an inclined manner.

4. The rear projector according to claim 1, wherein a planar position adjusting mechanism that adjusts the planar position of the image generator relative to the screen is provided on the support base.

5. The rear projector according to claim 4, the planar position adjusting mechanism comprising a slide adjuster that adjusts the position of the image generator in a direction along the screen and in normal line direction of the screen.

6. The rear projector according to claim 1, wherein a rotary position adjusting mechanism that adjusts rotary position of the image generator relative to the screen is provided on the support base.

7. The rear projector according to claim 6, wherein the rotary position adjusting mechanism adjusts the rotation of the image generator around planar position of the optical axis of the light beam irradiated by the projection optical system.

8. The rear projector according to claim 1,
   wherein both of the base member and the support base are provided with a screwing mechanism extending toward the opposing base member or the support base, and
   wherein the inclination position adjusting mechanism is a screwing component having a first end screwed to the screwing mechanism of the base member and a second end screwed to the screwing mechanism of the support base.

9. The rear projector according to claim 1,
   wherein either one of the base member or the support base is provided with a screwing mechanism extending toward the opposing base member or the support base, and
   wherein the inclination position adjusting mechanism is provided with a screwing component having one end screwed to the screwing mechanism provided on one of the base member and the support base and a convex component provided on the other end of the screwing component rotatably fitted to a concave portion formed on the other of the base member and the support base.

10. The rear projector according to claim 1,
    wherein the securing devices are screws.

* * * * *